(12) United States Patent
Collinson et al.

(10) Patent No.: US 11,060,214 B2
(45) Date of Patent: Jul. 13, 2021

(54) PROCESSING METHODS AND APPARATUS TO MANUFACTURE A FUNCTIONAL, MULTI-SCALE, TAPERED FIBER FROM POLYMER FILAMENT

(71) Applicant: NORTHWESTERN UNIVERSITY, Evanston, IL (US)

(72) Inventors: David W. Collinson, Evanston, IL (US); Mitra J. Hartmann, Evanston, IL (US); L. Catherine Brinson, Evanston, IL (US)

(73) Assignee: Northwestern University, Evanston, IL (US)

( * ) Notice: Subject to any disclaimer, the term of this patent is extended or adjusted under 35 U.S.C. 154(b) by 242 days.

(21) Appl. No.: 16/102,364

(22) Filed: Aug. 13, 2018

(65) Prior Publication Data
US 2019/0048495 A1    Feb. 14, 2019

Related U.S. Application Data

(60) Provisional application No. 62/544,206, filed on Aug. 11, 2017.

(51) Int. Cl.
*B29C 55/04*    (2006.01)
*D02J 1/22*    (2006.01)
(Continued)

(52) U.S. Cl.
CPC ............ *D02J 1/224* (2013.01); *B29C 55/005* (2013.01); *D01D 10/04* (2013.01); *D02J 1/225* (2013.01);
(Continued)

(58) Field of Classification Search
CPC ..................................................... B29C 55/04
See application file for complete search history.

(56) References Cited

U.S. PATENT DOCUMENTS

| | | | | |
|---|---|---|---|---|
| 3,253,506 A | * | 5/1966 | Marks ...................... | B29C 55/04 |
| | | | | 359/487.02 |
| 3,676,038 A | * | 7/1972 | Orzechowski ........... | D02G 3/20 |
| | | | | 425/464 |

(Continued)

FOREIGN PATENT DOCUMENTS

JP    2002116101    4/2002

OTHER PUBLICATIONS

Harun et al, Theoretical analysis and fabrication of tapered fiber, Optik, 124, 2013, pp. 538-543 (Year: 2013).*

(Continued)

*Primary Examiner* — Timothy Kennedy
(74) *Attorney, Agent, or Firm* — Bell & Manning, LLC

(57) ABSTRACT

Systems, methods, and apparatus to provide artificial whisker filaments are disclosed and described. An example artificial whisker is tapered to include a tip diameter smaller than a base diameter of the artificial whisker, the artificial whisker formed from a polymer arranged to permit elastic deformation of the artificial whisker, the deformation of the artificial whisker to transmit force to a sensor associated with a base of the artificial whisker. An example method of manufacturing an artificial whisker includes removably affixing a first end of a filament to a heated, non-stick surface; drawing the filament across the surface to form a first, tapered portion, a second portion of the filament remaining on the surface, wherein the filament is to be drawn until the first portion is disengaged from the surface; and separating the first, tapered portion of the filament from the second portion of the filament to form a tapered artificial whisker.

10 Claims, 17 Drawing Sheets

(51) Int. Cl.
*B29C 55/00* (2006.01)
*D01D 10/04* (2006.01)
*G01L 1/04* (2006.01)
*G01L 5/169* (2020.01)

(52) U.S. Cl.
CPC .............. *G01L 1/04* (2013.01); *G01L 5/169* (2020.01); *B29C 2791/002* (2013.01); *D10B 2401/06* (2013.01)

(56) References Cited

U.S. PATENT DOCUMENTS

| | | | |
|---|---|---|---|
| 6,014,652 | A | 1/2000 | Hill et al. |
| 8,504,500 | B2 | 8/2013 | Hartmann et al. |
| 9,092,737 | B2 | 7/2015 | Hartmann et al. |
| 2005/0246297 | A1 | 11/2005 | Chen et al. |
| 2008/0235972 | A1 | 10/2008 | Kato et al. |
| 2009/0133508 | A1 | 5/2009 | Johansson et al. |
| 2009/0315989 | A1 | 12/2009 | Adelson |
| 2010/0071222 | A1 | 3/2010 | Solomon et al. |
| 2011/0029470 | A1 | 2/2011 | Hartmann et al. |
| 2016/0152946 | A1* | 6/2016 | Choi ............... A61L 27/383 425/383 |

OTHER PUBLICATIONS

Ning, The Fabrication and Structure-Processing Relationships of Biomimetic Rat Whisker, Northwestern University, Master Thesis, 2017 (Year: 2017).*
Collinson et al, Tapered Polymer Whiskers to Enable Three-Dimensional Tactile Feature Extraction, Soft Robotics, 2020 (Year: 2020).*
Bebek O. et al., "Whisker Sensor Design for Three Dimensional Position Measurement in Robotic Assisted Beating Heart Surgery," IEEE International Conference on Robotics and Automation, Roma, Italy, Apr. 2007, pp. 225-231.
Fend M. et al., "An Active Artificial Whisker Array for Texture Discrimination," Proceedings of the 2003 IEEE/RSJ Intl. Conference on Intelligent Robots and Systems, Las Vegas, Nevada, Oct. 2003, pp. 1044-1049.
Fend M. et al, "On the influence of morphology of tactile sensors for behavior and control," Robotics and Autonomous Systems, Elsevier Science Publishers, Amsterdam, NL, vol. 54, No. 8, Aug. 31, 2006, pp. 686-695.
Fend M. "Whisker-Based Texture Discrimination on a Mobile Robot," ECAL 2005, pp. 302-311.
International Searching Authority, "International Search Report and Written Opinion," issued in connection with counterpart international application No. PCT/US2010/043980, dated Oct. 25, 2010 (15 pages).
International Bureau "International Preliminary Report on Patentability," issued in connection with International Application Serial No. PCT/US2010/043980, dated Feb. 9, 2012, 7 pages.
Kaneko M. et al., "3-D Active Antenna for Contact Sensing," IEEE International Conference on Robotics and Automation pp. 1113-1119, 1995.
Kaneko M. et al., "Active Antenna for Contact Sensing," IEEE Transactions on Robotics and Automation, vol. 14, No. 2, Apr. 1998, pp. 278-291.
Kim D. et al., "Biomimetic Whister Experiments for Tactile Perception," Proceedings of the International Symposium on Adaptive Motion in Animals and Machines, pp. 1-7, 2005.
Kim D. et al., "Biomimetic whiskers for shape recognition," Robotics and Autonomous Systems, vol. 55, pp. 229-243, 2007.
Lee M. et al., "Review Article Tactile sensing for mechatronics—a state of the art survey," Mechatronics, Pergamon Press, Oxford, GB, vol. 9, No. 1, Feb. 1, 1999, pp. 1-31.
Russell R. et al., "Multi-Sensory Synergies in Humanoid Robotics," International Journal of Humanoid robotics, 2004, 24 pages.
Russell R. et al., "Object Location and Recognition using Whisker Sensors," Australasian Conference on Robotics and Automation, pp. 1-9, 2003.
Scholz G. et al., "Profile Sensing With an Actuated Whisker," IEEE Transactions on Robotics and Automation, vol. 20, No. 1, Feb. 2004, pp. 124-127.
Schultz A. et al., "Multifunctional Whisker Arrays for Distance Detection, Terrain Mapping, and Object Feature Extraction," Proceedings of the 2005 IEEE International Conference on Robotics and Automation, Barcelona, Spain, pp. 2588-2593, Apr. 2005.
Solomon J. et al., "Robotic whiskers used to sense features," Nature, vol. 443, Oct. 5, 2006, p. 525 and supplemental information, (13 pages).
Yokoi H., "Artificial Whiskers: Structural Characterization and Implications for Adaptive Robots," Journal of Robotics and Mechatronics, vol. 17, No. 5, pp. 584-595, 2005.
United States Patent and Trademark Office, "Non-Final Office Action," issued in connection with U.S. Appl. No. 13/663,196, dated Sep. 25, 2014, (24 pages).
United States Patent and Trademark Office, "Notice of Allowance," issued in connection with U.S. Appl. No. 13/663,196, dated Mar. 31, 2015, (8 pages).
United States Patent and Trademark Office, "Non-final Office Action," issued in connection with U.S. Appl. No. 12/847,822, dated Oct. 29, 2012, (28 pages).
United States Patent and Trademark Office, "Notice of Allowance," issued in connection with U.S. Appl. No. 12/847,822, dated May 28, 2013, (9 pages).

* cited by examiner

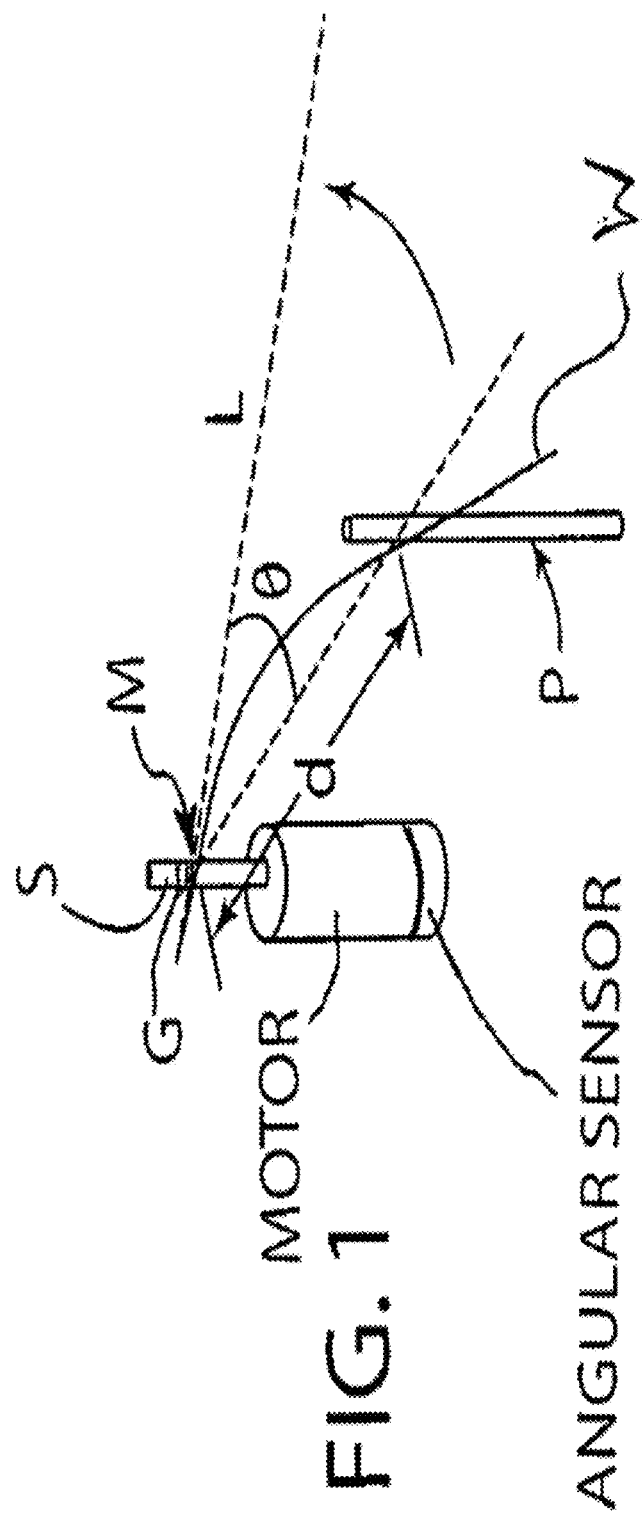

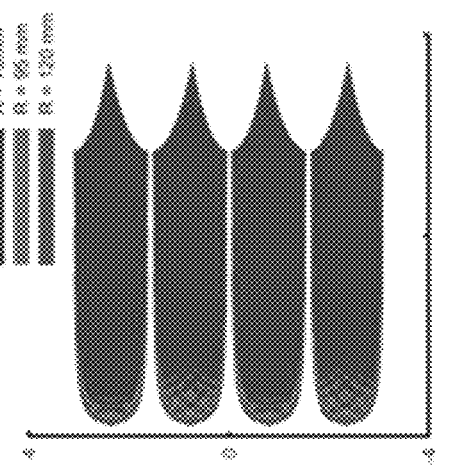
FIG. 14A
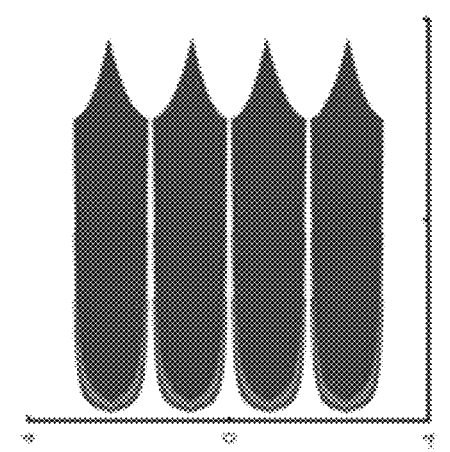
FIG. 14C
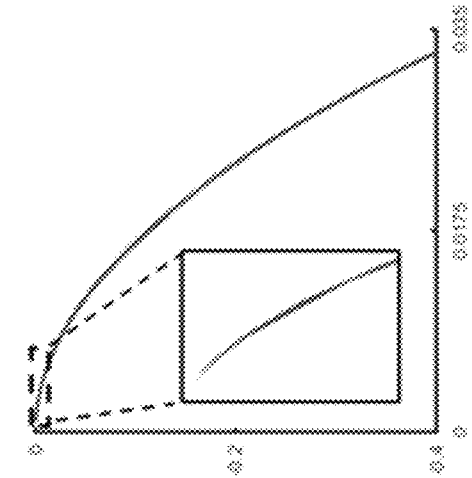
FIG. 14E
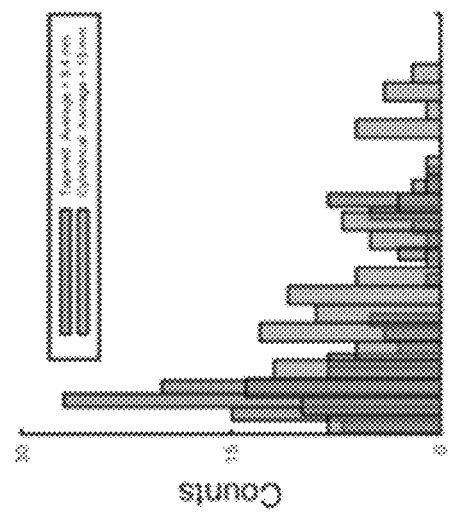
FIG. 14B
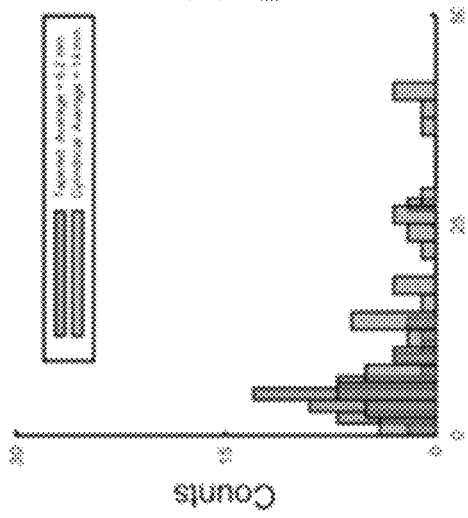
FIG. 14D
FIG. 14F

PROCESSING METHODS AND APPARATUS TO MANUFACTURE A FUNCTIONAL, MULTI-SCALE, TAPERED FIBER FROM POLYMER FILAMENT

CROSS-REFERENCE TO RELATED APPLICATIONS

This patent claims the benefit of U.S. Provisional Application Ser. No. 62/544,206, entitled "PROCESSING METHODS AND APPARATUS TO MANUFACTURE A FUNCTIONAL, MULTI-SCALE, TAPERED FIBER FROM POLYMER FILAMENT," which was filed on Aug. 11, 2017, and which is hereby incorporated herein by reference in its entirety for all purposes.

STATEMENT REGARDING FEDERALLY SPONSORED RESEARCH OR DEVELOPMENT

This invention was made with government support under IOS 1529934, IIS 1208118 and CMMI 1235355 awarded by the National Science Foundation; R01 NS093585 awarded by the National Institutes of Health; 70NANB14H012 awarded by the National Institute for Standards and Technology. The government has certain rights in the invention.

FIELD OF INVENTION

The presently described technology generally relates to tactile sensing. In particular, the presently described technology relates to systems, methods, and apparatus to manufacture a functional, multi-scale, tapered fiber from polymer filament.

BACKGROUND

Whiskers have attracted increasing interest from engineers seeking to imitate their numerous desirable sensing properties. Whiskers are physically robust, mechanically simple, and yet can precisely extract object shape, texture and the velocity of fluid flow. The diverse capabilities of whiskers are amply demonstrated by the animals that use them to perform difficult behavioral tasks. Robotic whiskers have been used for various types of sensing tasks, and several recent studies have specifically addressed the issue of three-dimensional (3-D) feature extraction, wherein the goal is to infer the shape of an object by repeated contact with one or more whiskers. These studies have generally taken one of two approaches: whisker "tapping" or whisker "sweeping."

Whisker tapping involves rotating or translating the whisker(s) against an object by a small angle and inferring where along the length of the whisker initial contact occurred (i.e., radial distance extraction). Using this information, along with information about the angle of initial contact and location of the whisker base, allows estimation of the contact point location in 3-D space for each whisker.

Whisker sweeping involves moving the whisker along or against the object far past the location of initial contact in order to estimate a collection of contact point locations as the whisker slips along the surface.

BRIEF DESCRIPTION OF SEVERAL VIEWS OF THE DRAWINGS

FIG. 1 is a schematic view of sensing device having a whisker element rotated by motor against an object.

FIGS. 14A-14F show example simulation and experimentation results and comparison between contact points on cylindrical and tapered whisker filaments.

Figure 2A:
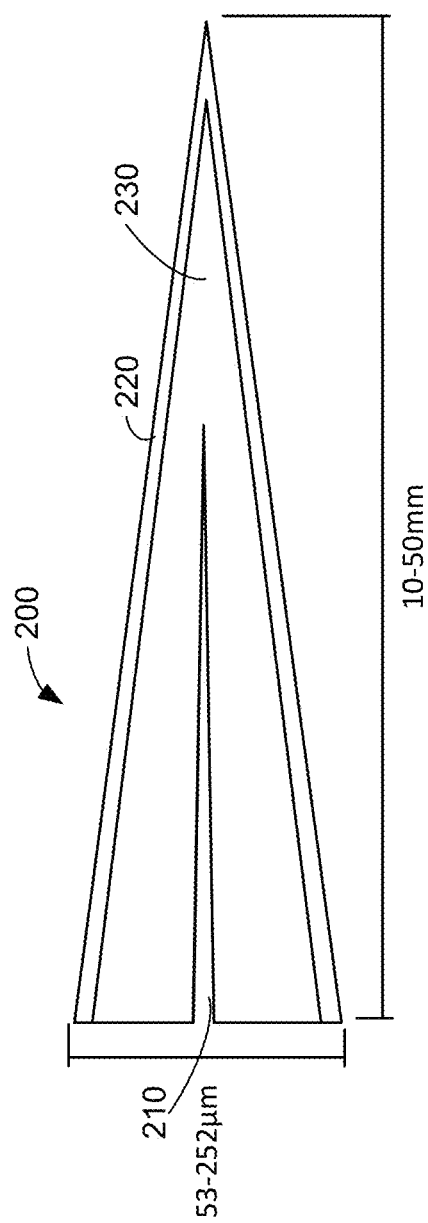
FIGS. 2A-2B illustrate an example whisker formed from polycarbonate in fused deposition modeling.

The following detailed description of certain embodiments will be better understood when read in conjunction with the appended drawings. For the purpose of illustrating the invention, certain embodiments are shown in the drawings. It should be understood, however, that the present invention is not limited to the arrangements and instrumentality shown in the attached drawings, nor is it limited to particular whisker and/or other sensor geometries (e.g., length, taper, or intrinsic curvature), configurations, etc.

DETAILED DESCRIPTION OF CERTAIN EXAMPLES

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components can be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any resulting claims are read to cover a purely software and/or firmware implementation, in at least one example, at least one of the elements is hereby expressly defined to include a tangible medium such as a memory, DVD, Blu-ray, CD, etc. storing the software and/or firmware.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As used herein, the terms "system," "unit," "module," "engine," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, engine, or system may include a hard-wired device that performs operations based on hard-wired logic of the device. Various modules, units, engines, and/or systems shown in the attached figures may represent the hardware that operates based on software or hardwired instructions, the software that directs hardware to perform the operations, or a combination thereof.

Rats and other mammals use their vibrissae (whiskers) to sense the location and topology of objects in their surroundings. A biomimetic artificial whisker/hair can be used in robotics by placing a sensor at the whisker/hair base. Forces are transmitted to sensor at the whisker base via deformations of the whisker. However, some methods for sensing object location and topology require the whisker to have a very specific geometry and material properties. Creating an artificial whisker poses both manufacturing and materials challenges: the whisker diameter must taper in a manner that bridges micro and macro length scales, and the whisker must have material properties that permit large elastic deformations. Certain examples provide a whisker developed using a 3-D printable polycarbonate (e.g., Polymaker PC-Max™, etc.). A process referred to as "surface conforming fiber drawing" can be used to create tapered whiskers with length-to-tip-diameter aspect ratios between 100 and 10,000, for example. The whiskers exhibit highly functional mechanical properties and can undergo large elastic deformations. In certain examples, a cylindrical filament is clamped at one end and laid across a heated Teflon™ and/or other polytetrafluoroethylene plate that raises the temperature of the filament past the glass transition temperature (Tg) of the material. A small constant force (e.g., 200 millinewtons-2 Newtons (N)) is then applied to the filament to deform the filament and produce a taper over a period of ~30 s, for example. Depending on the desired dimensions of the whisker, the applied force and drawing period can be varied. A small constant velocity can be applied to the filament to deform the filament and produce a taper in the filament over a time period.

Certain examples develop and characterize an artificial whisker for use as part of a sensory input device that is a bio-mimic of the biological rat whisker neuro-sensory system. Vibrissae (whiskers) are tapered structures with excellent mechanical properties that can transmit a mechanical signal as a result of deformations in the whisker. Certain examples use a known, well controlled taper to locate where a force is acting on a whisker through a measured mechanical signal at the whisker's base. Certain examples provide 'surface conforming fiber drawing' (SCFD) to produce artificial whiskers that successfully mechanically and geometrically mimic a biological rat whisker. Developed whiskers can then be characterized at the macroscale and nanoscale to investigate the mechanical properties of the whiskers and how the whisker properties are impacted by the manufacturing process in an effort to develop a processing-structure-property relationship. For example, a storage modulus of a SCFD whisker in three point bending conditions increases along the length of the whisker with the whisker tip 25-40% stiffer than the base. Filler migration and coalescence during the processing can be responsible for this mechanical behavior, for example. The whisker can be controlled and/or incorporated into a robotic sensory system.

Certain examples facilitate production of haptic sensory devices for mechanical phenotyping of cancer and other disease in the mouth and throat. Certain examples facilitate production of a complementary depth sensor for use in conjunction with computer vision (which has trouble resolving depth). Certain examples facilitate production of a haptic sensory device for robots operating in remote/confined/poor-visibility environments where conventional computer vision is not sufficient.

Certain examples produce tapered filaments with very small tip diameters (e.g., <50 microns) compared to base diameter (e.g., ~1.7 mm). Other technologies cannot produce tapered whiskers with high base diameter/tip diameter aspect ratios. Certain examples use polymers with good mechanical properties. Casting and extrusion technologies cannot use such polymers and still produce the required geometry. Certain examples provide higher surface quality and smooth (non-digital) taper compared to 3-D printed whisker geometries.

Certain examples facilitate manufacture tapered filaments out of polymers that have functional mechanical properties. Tapered filaments can be used to perform 3-D object feature extraction, flow sensing, etc. Previous solutions have been unable to produce a tapered whisker with sufficient mechanical properties, thus limiting the application of the prior devices. Certain examples facilitate development of new products/components (e.g., in robotics) that utilize the previously unachievable geometry for haptic and/or flow sensing. Certain examples provide whiskers with a taper that allows the location of forces acting upon the whisker to be identified in conjunction with sensors at the whisker base. This development expands the range of applications for which active whisker sensory systems are useful.

FIG. 2A is a schematic of a biological whisker 200 from a rat. As shown in the example of FIG. 2A, the natural rat vibrissae includes three main regions: medulla 210, cuticula 220, and cortex 230. The medulla 210 is a highly porous core that extends most of the way up the whisker 200. The cuticula 220 is a protective outer layer. The bulk of the whisker 200 is called the cortex 230, and the cortex 230 is responsible for the majority of the whisker's mechanical properties. In certain examples, the whisker 200 is 10-50 mm long, 60-200 microns at the base and tapers linearly to a tip diameter less than 50 microns. When a load is exerted on the whisker 200, the whisker 200 deforms and sends a mechanical signal to a nerve system at the base of the whisker 200. If the whisker 200 is tapered, then the magnitude of the applied force as well as point of application along the length of the whisker 200 can be inferred.

Figure 2B:
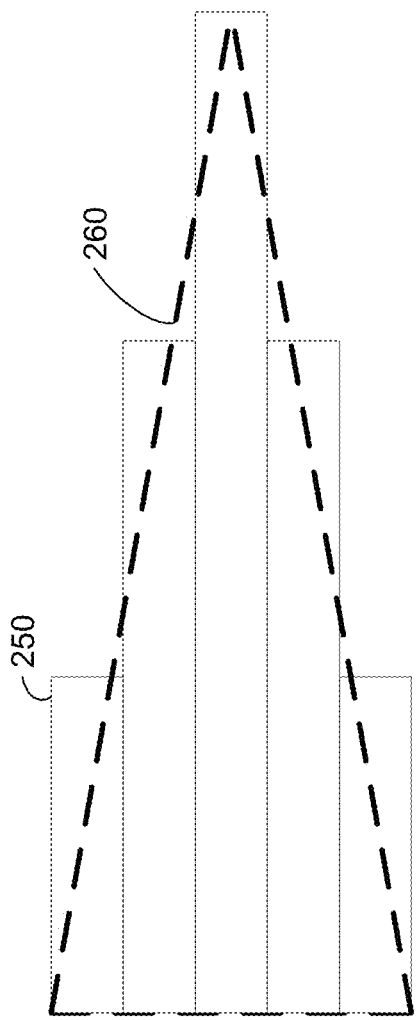

FIG. 2B illustrates an example whisker 250 formed with fused deposition modeling (FDM). The success of the developed whisker 250 can be characterized in terms of the replication of the biological vibrissae geometry. For example, as shown in FIG. 2B, a desired whisker geometry 260 can be modeled and 3-D printed using the additively manufactured whisker 250. Previous attempts at manufacturing an artificial rat whisker with FDM have either not had the required mechanical properties to elastically deform under the large deflection or do not sufficiently replicate the tapered geometry of the whisker due to the digital nature of 3-D printing.

Artificial whisker sensory systems can be used for robot operation in remote locations, in drones, and as support for computer vision, for example. Computer vision systems, such as Light Detection and Ranging (LIDAR), have trouble with depth resolution and complementary sensory array can help resolve this deficiency.

Figure 3:
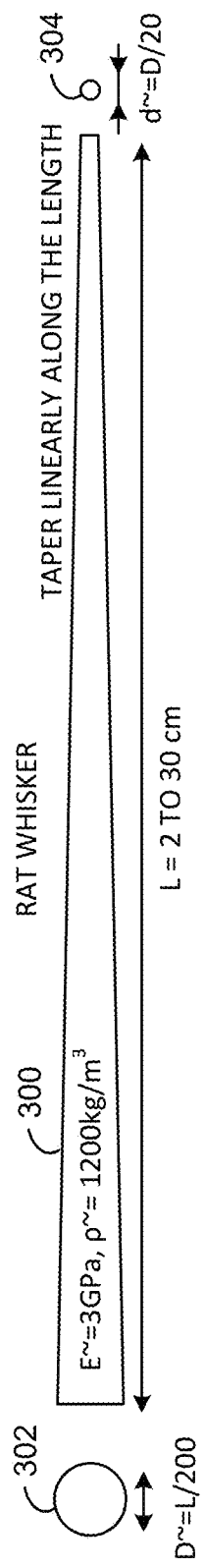
FIG. 3 shows an example tapered whisker.

To create an artificial whisker that is an accurate biomimic of the natural rat vibrissae, the mechanical and geometric properties of the natural rat vibrissae are to be reproduced. An example artificial whisker is five to seven times the size of a natural vibrissae (FIG. 2A), for example. A summary of mechanical and geometric properties is reflected in FIG. 3. As shown in the example of FIG. 3, a whisker 300 tapers linearly along its length, from a larger thickness, D 302, to a smaller thickness, d 304, along a length, L. The example whisker 300 has a stiffness or modulus, E (e.g., measured in Pascals), and a density, p (e.g., measured in kilograms per cubic meter, etc.), for example.

In certain examples, to test an ability of an SCFD filament to replicate the geometry of biological whiskers, the rostral and caudal whiskers of a reference rat can be targeted at a five to seven times scale. A metric used to characterize whisker behavior is a whisker slope, $R_{slope}$, which is defined by $$R_{slope}=(D-d)/L \quad (1),$$

where D is defined as the base diameter, d is the tip diameter, and L is the chord length. Typical biological rat whiskers have a $R_{slope}$ between 0.001-0.003. Target dimensions to produce caudal and rostral whiskers that are geometrically similar to biological specimens are shown in the following Table 1:

| Dimension | Caudal | Rostral |
|---|---|---|
| Tip Diameter (D) | ~25 μm | ~25 μm |
| Base Diameter (d) | 875 μm | 375 μm |
| Chord Length (L) | 250 mm | 100 mm |

Dynamic behavior of an artificial whisker is also important for the whisker to successfully function, particularly for the whisker to quickly recover from a deflection. To help prevent sensor drift, the whisker should have a short response time so that the whisker can quickly return from a deflection. However, if the whisker does not have sufficient intrinsic damping, then excessive vibration can occur after a deflection, introducing noise into a transmitted force signal. For polymeric materials, a polymer should be chosen with a glass transition temperature and damping properties that allow the whisker to return quickly from deformation with minimal or otherwise reduced vibration. Tan delta, dissipation factor, etc., can also provide metrics for polymer selection, for example.

Figure 4:
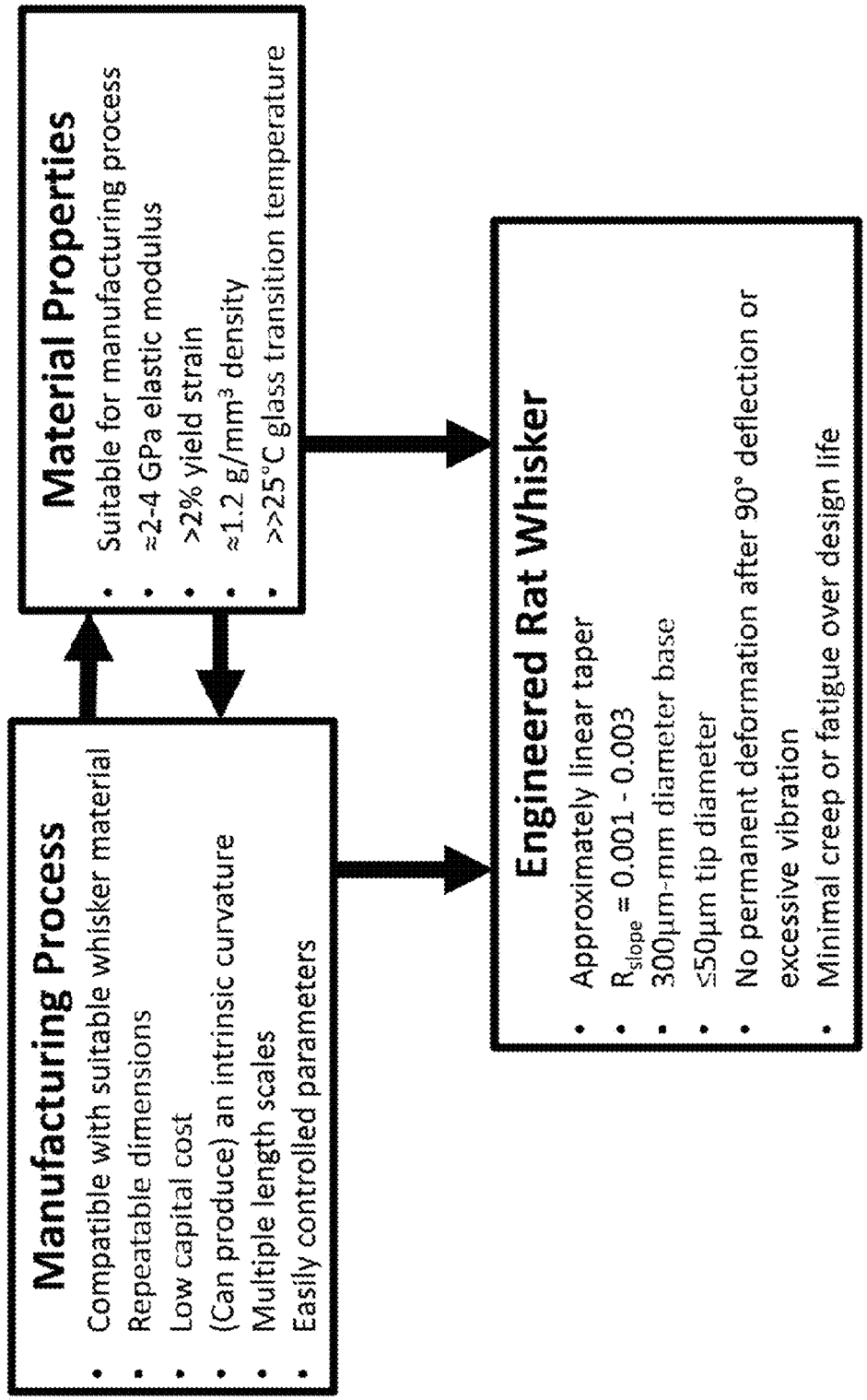
FIG. 4 shows example complexities in manufacturing process and material properties to form an engineered whisker.

Development of an artificial rat whisker at a scale for use in robotics involves a manufacturing process that can reliably produce the artificial whiskers using materials with certain mechanical properties. The production of these whiskers is not trivial due to several factors. First, the taper allows an artificial whisker to be able to spatially locate forces along its length and is a fundamental part of the design. Such properties of a taper eliminate conventional drawing or extrusion procedures that are used to produce cylindrical filaments. The taper also poses an additional problem as the artificial whisker straddles the macroscale (at the base) and the microscale (at the tip). That is, the whisker or filament gradually reduces from a macroscale diameter at its base to a microscale diameter at its tip. The small length scale at the tip presents a challenge for casting and molding techniques, especially as it is expected that thermoplastics that are stiff enough (e.g., ~3 GPa) may be too viscous to flow through channels tens of microns (e.g., 50 microns, etc.) in diameter when melted. The interwoven complexity of the engineering challenge involved with manufacturing these whiskers is presented in FIG. 4. The competing requirements between desired material properties, manufacturing process used, and performance of the produced whisker are all considered when assessing the success of a produced whisker.

In certain examples, geometry and mechanical properties are largely dependent on the biological rat vibrissae. In addition, the whisker is to function as part of a robotic device, sustain repeated loads, and operate in a variety of environmental conditions, for example. The whisker should be able to undergo a ninety-degree (90°) deflection elastically and be able to repeatable deflect in all orientations without being susceptible to fatigue or significant creep. A factor in the whisker's performance is also how the whisker is mounted to an electronic sensory system and can transmit a mechanical deformation along the entire length of the whisker to sensors located at the base of the whisker, for example.

Material Selection

Table 2 lists some example engineering polymers with sufficient mechanical properties for a functional whisker. One or more polymers, such as polycarbonate, polysulfone, etc., can be selected to be processed into filaments for whisker generation. However, many of these traditional polymers are not suitable for drawing procedures.

Table 2 shows properties of conventional engineering polymers identified as being suitable for rat whiskers.

| Material | Yield Strain (%) | Elastic Modulus (GPa) | Glass Transition Temp (° C.) | Density (g/cc) |
|---|---|---|---|---|
| PolySulfone | 0.200-80.0 | 1.80-35.2 | 185-266 | 1.13-1.72 |
| Polyphenyl-Sulfone | 0.180-120 | 0.069-8.14 | 220-230 | 1.24-2.00 |
| ABS/PC Alloy | 1.90-100 | 1.67-10.3 | 125 | 0.900-1.40 |
| Extruded PC | 6.00-50.0 | 1.79-3.24 | 145-150 | 1.19-1.26 |
| PEEK | 4.00-6.00 | 2.20-12.0 | 143-150 | 1.26-2.40 |
| PES | 6.7 | 2.70 | 222 | 1.37 |
| Epoxy Resin | 5.2 | 3.24 | 121 | 1.335 |
| PEI | 6.0 | 3.11 | 247 | 1.30 |
| PAEK | 5.7 | 2.90 | 158 | 1.29 |
| HDPE | 6.6-80.0 | 0.45-1.5 | −110 | 0.924-2.55 |
| LDPE | 226-650 | 0.152-0.29 | −11 | 0.915-0.914 |
| Cyclo-Olefin Polymer | 10 | 2.50 | 135 | 1.01 |
| Desired | >3 | 2-4 | >>25° C. | 0.8-1.6 |

Filaments for fused deposition modelling (FDM) can also be used in constructing the whiskers using similar criteria as the conventional polymers. A benefit of using commercial polymers developed for FDM is that they include additives to improve their ability to flow when melted, lower the glass transition temperature and improve the material ductility compared to traditional engineering polymers. Improvements in ductility and processability are desirable for the application here. The choice of additives is dependent on the polymer and can create polymer composites if they are immiscible with the polymer, which can complicate the process-structure-property relationship.

Table 3 lists example filaments to be used for whisker production. Filaments with good mechanical properties are fairly limited as additives used to make a polymer three-dimensional (3-D) printable can soften and reduce the elastic stiffness of the material. From these printer filaments, the Polymaker PC-Max™ and the Stratasys M30i™ have been determined to be the most suited for use due to their ability to draw and deform elastically with an elastic modulus close to, for example, a desired 2-4 GPa range.

Table 3 shows example commercial polymer filaments developed for fused deposition modeling.

| Filament | Tensile Strength (MPa) | Yield Strain (%) | Elongation at Break (%) | Elastic Modulus (MPa) | Tg (° C.) | Printing Temp (° C.) | Diameter (mm) |
|---|---|---|---|---|---|---|---|
| Polymaker ® PC-Max ™ | 59.7 | — | 12.24 | 2048 | 113 | 250-270 | 1.75/2.85 |
| Polymaker ® PC-plus ™ | 62.7 | — | 3.15 | 2307 | 112 | 250-270 | 1.75/2.85 |
| Taulman ® n-vent ™ | 50 | 5 | 110 | 1900 | — | 245 | 1.75/2.85 |
| Stratasys ®ASA ™ | 30 | 2 | 9 | 1950 | 108 | — | — |
| Stratasys ® ABS m30i ™ | 41 | — | 6 | 1900 | 125 | — | — |
| Desired | ~60 MPa | >3 | >>3 | 2000-4000 | <<25 | <260 | — |

Example Manufacturing Procedures

Certain examples evaluate a multitude of different manufacturing processes and materials to determine what method could produce the best artificial rat whisker. Table 4 provides a quantitative measure of the success of various manufacturing methods using a suitable material. For example, PolyCarbonate (PC), PolySulfone (PSU), Polymaker® PC-max™ (PC-Max) and Stratasys® m30i™ (m30i), etc., can be used. Injection Molding (IM)(30), Vacuum assisted micromolding (VAM)(31), fused deposition modelling (FDM), and surface conforming fiber drawing (SCFD) are manufacturing processes that can be suitable for rat whisker manufacture. Example manufacturing process/material combinations can be assessed on a numerical scale from 1-5 (where 1 is poor and 5 is excellent), for example. The 'material properties' score is a measure of a manufacturing process/material combination to mimic the properties of a real rat whisker. 'Taper quality' measures how well the process is expected to create a linearly tapered whisker. 'Whisker dimensions' assesses the dimensional accuracy and the range of aspect ratios that are achievable. The 'Developable' score is determined by how much the process can be developed to improve whisker quality. 'Scale' is the ability of the method to scale and produce multiple whiskers at once. 'Cost' is the expense to set up and run a manufacturing process. 'Repeatability' is the ability of a process to reliably create whiskers with intended dimensions.

Table 4 illustrates a summary of outcomes from the investigation into manufacturing processes and materials. Each method is ranked on a scale of 1-5 where 1 is poor and 5 is excellent.

From the scores given in Table 4, surface conforming fiber drawing (SCFD), vacuum assisted micromolding, etc., can be used in the development and manufacture of artificial rat whiskers.

Surface Conforming Fiber Drawing

Figure 5A:
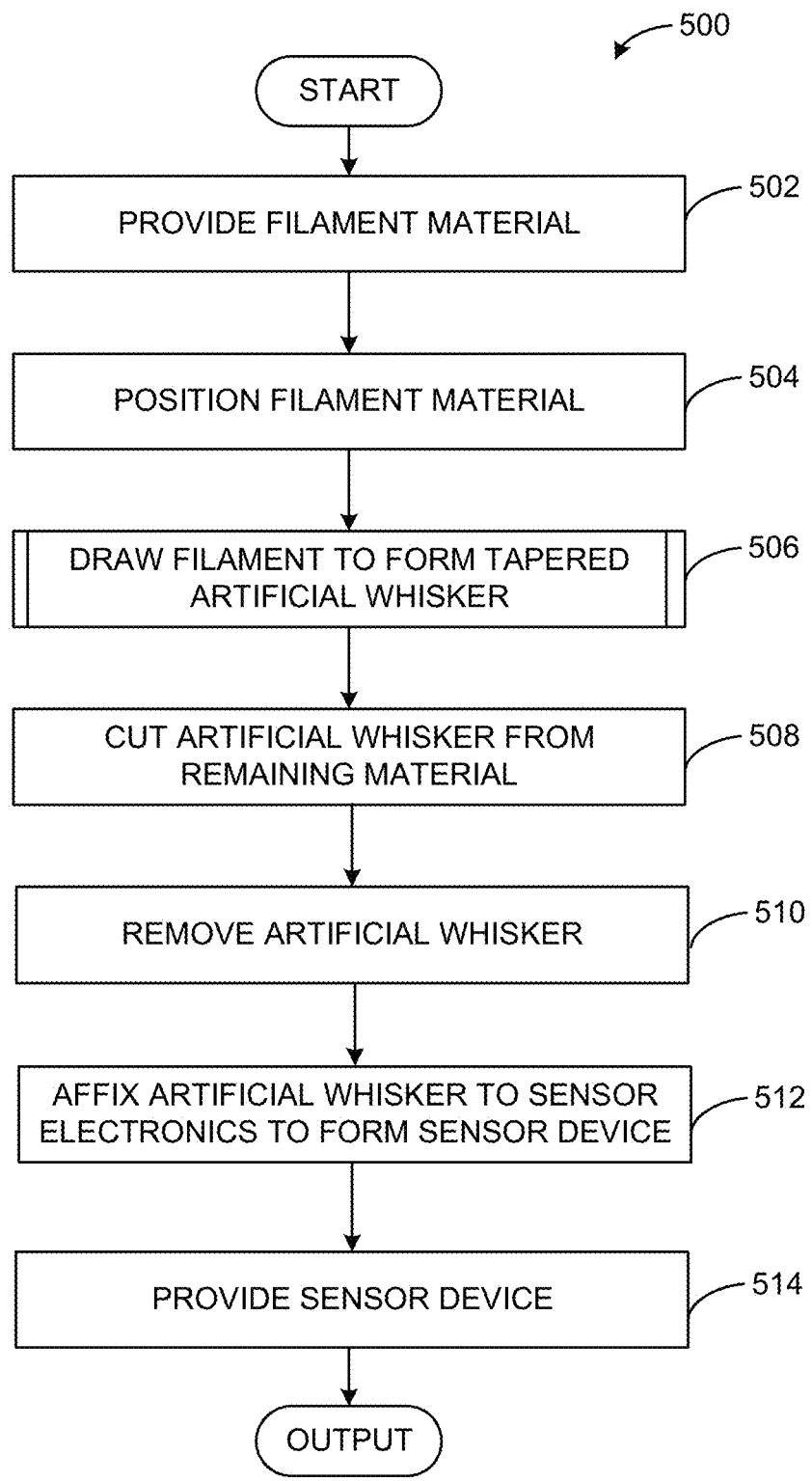
FIGS. 5A-5B illustrate flow diagrams of example methods to form a tapered whisker from a filament.

Certain examples produce artificial rat whiskers using a modified drawing procedure that forms a tapered structure from a stock filament, such as a filament made of Polymaker PC-max™, Stratasys M30 ABS (acrylonitrile butadiene styrene), etc. FIG. 5A illustrates a flow diagram of an example method 500 to form a tapered whisker from a stock filament.

At block 502, filament material is provided. For example, a quantity of PC-Max™, ABS, and/or other polymer can be melted, injected, and/or otherwise formed into a supply of filament material to be drawn into an artificial whisker. At block 504, the filament material is positioned for artificial whisker formation. For example, the filament material can be fed to a fixed end and/or otherwise removably affixed in a chamber or mold having a heated surface.

At block 506, the filament is drawn to form a tapered artificial whisker. For example, a clamping device, fixed end with a cavity, depression, or opening, etc., can be used to position a first end of the filament material, which is then pulled or drawn across and beyond a heated surface. The heat and pulling motion cause a second end or portion of the filament to taper according to a defined taper profile (e.g., relating to heat, distance/length, pulling velocity, etc.). For example, a controllable taper profile defines a velocity and processing temperature (or range of velocities and/or processing temperatures) to produce a desired taper in the filament. At block 508, the tapered artificial whisker is cut from remaining material. Then, the tapered artificial whisker remains, separated from any remaining filament material.

At block 510, the artificial whisker is removed. For example, an arm, conveyer, etc., can move the artificial whisker to another apparatus and/or another location in the formation apparatus. At block 512, the artificial whisker is

| | Whisker Quality | | | Manufacture Process | | | | | |
|---|---|---|---|---|---|---|---|---|---|
| Method/Material | Material Properties | Taper Quality | Whisker Dimensions | Developable | Scale | Curvature | Cost | Repeatable | Total |
| IM/PC and PSU | 3 | 3 | 2 | 2 | 5 | 2 | 1 | 5 | 23 |
| VAM/PC | 5 | 5 | 3 | 3 | 4 | 3 | 1 | 5 | 29 |
| FDM/PC-Max | 4 | 1 | 3 | 2 | 3 | 4 | 3 | 2 | 22 |
| FDM/m30i | 4 | 1 | 3 | 2 | 3 | 4 | 3 | 2 | 22 |
| FC/PC-Max | 4 | 2 | 2 | 4 | 4 | 4 | 5 | 4 | 29 |
| FC/m30i | 4 | 2 | 2 | 4 | 4 | 4 | 5 | 3 | 28 |
| SCFD/PC-Max | 4 | 4 | 5 | 4 | 4 | 4 | 5 | 3 | 33 | affixed to sensor electronics to form a sensor device. Thus, for example, a multi-bar linkage device, a motor, a processor, and/or other device including and/or otherwise attached to one or more artificial whiskers can form a sensor device to be used to obtain tactile sensor feedback regarding an object or environment. At block 514, the sensor device is provided for use.

Figure 5B:
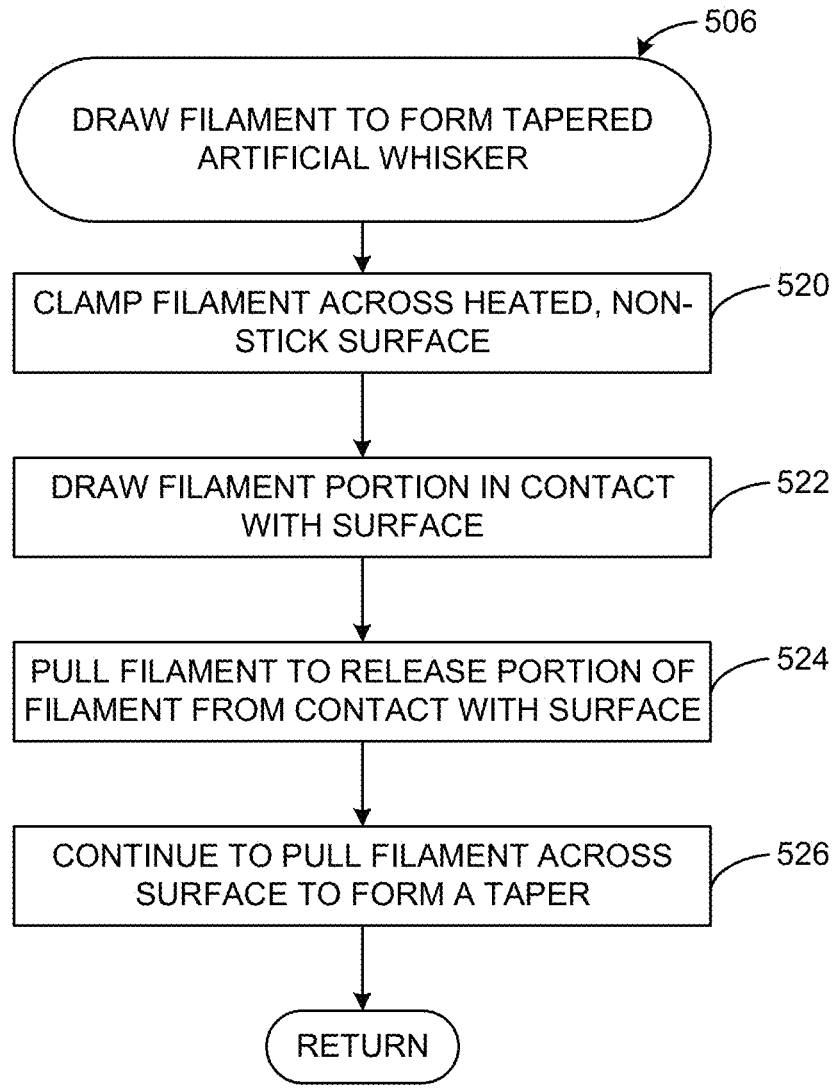

FIG. 5B provides further detail regarding an example implementation of drawing the filament to form a tapered artificial whisker (block 506 of the example of FIG. 5A). At block 520, a filament is clamped at one end and the other end is pulled (e.g., by a pincer, clamp, and/or other gripping device, etc.) across a heated non-stick surface. At block 522, if the filament is heated sufficiently past its transition temperature, Tg, a portion of filament that is in contact with the surface is drawn due to the pulling action. At block 524, when the filament loses contact with the surface (e.g., is disengaged from the surface), it cools below its Tg and maintains the newly drawn shape. At block 526, the filament that remains on the surface is drawn further, causing a taper to be formed as the filament is pulled across the surface. Thus, the filament is formed into a drawn, tapered artificial whisker.

Figure 6A:
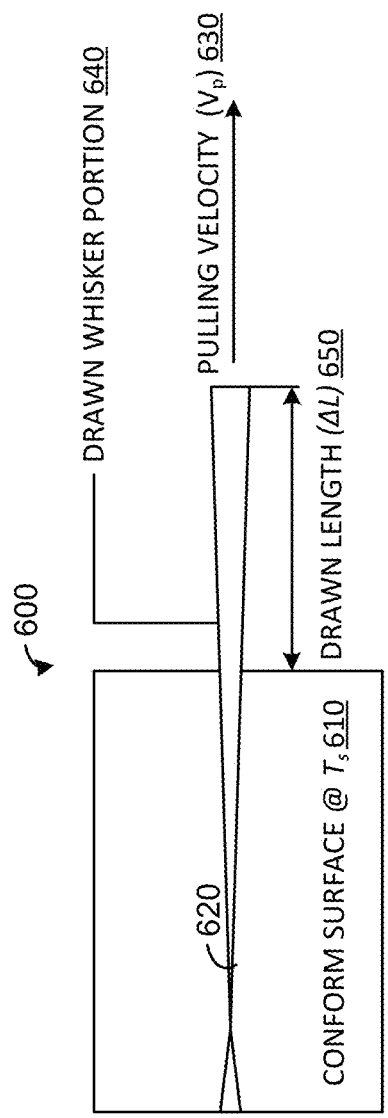
FIGS. 6A-6B show schematics of an example filament pulled into a whisker according to the process of FIG. 5.

Manufacturing parameters can have an impact on the whisker geometry. Parameters include a temperature of the surface (Ts), a drawn length of the filament (ΔL), and a rate at which the filament is pulled (Vp) to form the whisker. FIG. 6A depicts these example parameters on a schematic of an example filament 600 clamped at one end and being pulled into a whisker according to the SCFD manufacturing process of FIG. 5. The example of FIG. 6A shows a conform surface at Ts 610 (e.g., a heated, non-stick surface) on which filament material 620 is placed. A pulling velocity, Vp, 630 is applied to generate a drawn whisker portion 640 with a drawn length ΔL 650. Thus, if the whisker filament 600 is heated sufficiently past the Tg, the filament that is in contact with the surface 610 is drawn 640 due to the pulling action. When the filament loses contact with the surface 610, it cools below its Tg and maintains the newly drawn shape. The filament 620 that remains on the surface 610 is drawn further, causing a taper to be formed as the filament is pulled across the surface 610.

Figure 6B:
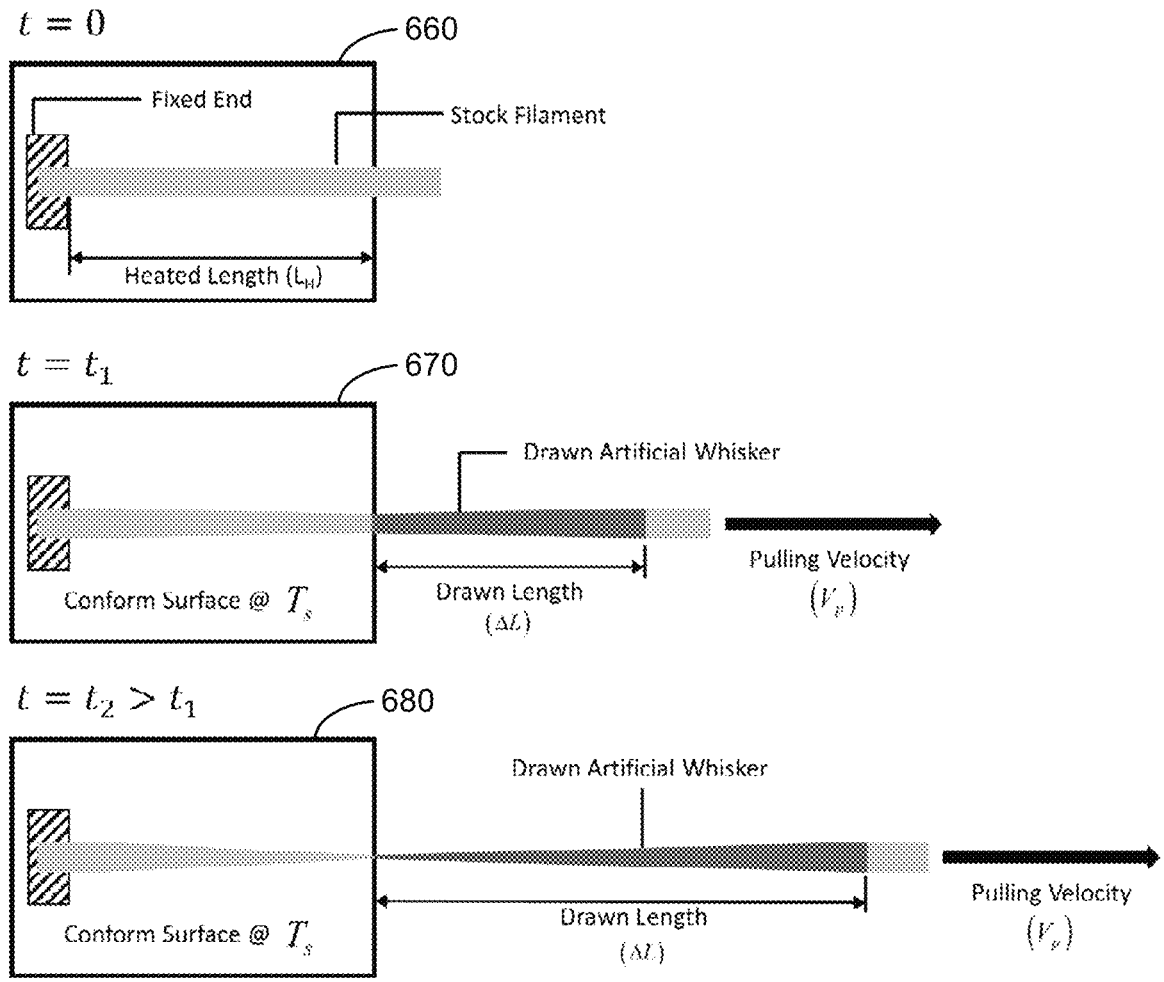

FIG. 6B depicts an example schematic showing the drawing or pulling of the artificial whisker or filament 600 shown in the example of FIG. 6A. As shown in the example of FIG. 6B, several manufacturing parameters have an impact on the whisker geometry. These parameters include the temperature of the surface ($T_s$), the rate and acceleration of the pulling motion ($V_p$, $\dot{V}_p$), the drawn length of the whisker (ΔL), and the heated length ($L_H$). It was found during processing that the best profiles result from a nonlinear application of force. As the whisker draws, the cross-sectional area reduces. As such, a smaller force is required to maintain the drawing process. A force that is too large would cause the whisker to break prematurely before the desired taper profile is achieved.

At 660, a filament is in an initial position before being pulled/drawn. At time t=0, an end of the filament is fixed (e.g., clamped, pinned, etc.), and the filament rests on a heated surface over a heated length $L_H$. At 670 (time t=t1), the filament is drawn a length ΔL at a pulling velocity $V_p$. At 680, (at a time t=t2, which is greater than (after) t1), the whisker filament is drawn to a desired tip diameter (e.g., a desired taper profile), which can be trimmed and used in a sensor, for example.

Typically, drawing manufacturing procedures focus on reducing the diameter of a cylindrical fiber (or fibre) to produce a thinner cylindrical fiber. However, in the manufacturing process of FIGS. 5-6B, formation of the transition region is instead the focus. With careful control of the pulling action, tapered filaments can be produced. In certain examples, using a polycarbonate engineered for fused deposition modelling aids the tapering over conventional engineering polycarbonate due to increased ability of the polymer to flow when melted. A material such as PC-Max™, for example, also has a lower glass transition temperature (Tg) than conventional polycarbonate reducing the required surface temperature (Ts).

Implementation of SCFD Whiskers as a Sensory Device

Certain examples provide reconstruction of three-dimensional (3-D) object morphology, position, orientation and compliance using an array of tactile sensors.

In certain examples, signals that come from a set of tactile sensors mounted on a surface are used to determine the 3-D morphology (including size, shape, orientation, position) and compliance of objects of arbitrary shape. The algorithm used to interpret the sensory data may include analytical, mechanical, numerical, and/or neural network approaches.

The tactile sensors may be flexible and resemble hair, whiskers, and/or antenna. Sensors may be embedded in the surface to form a more skin-like structure, or they may be a combination of any of these implementations, for example. In the case that the tactile sensors are hair-like, whisker-like or antenna-like, they may have sensors all along their length and/or they may have sensors at their base. The sensors may be of different or similar geometries, including features such as taper, taper ratio, intrinsic curvature, and length.

The surface on which the tactile sensors are mounted may be rigid, or it may be flexible and/or deformable. The sensors themselves may be flexible and/or deformable. The internal distribution of stresses and strains within the surface may also be measurable. The surface (and attached sensors) may be moved with any numbers of degrees of freedom against an object, and/or an object may be moved against the surface (and attached sensors) with any numbers of degrees of freedom. The sensors themselves may be actuated or static with respect to the surface which may or may not itself move. The described technologies can accommodate for movement of the array with respect to the object, the object respect to the whisker, and both simultaneously.

The sensors themselves may be actuated or static with respect to the surface. The signals coming from the sensors may be sensed by technologies that include but are not limited to the following: vision-based, photo-interrupter, photoelastic, magneto-sensing, strain gage, capacitive, binary, force/torque load cell, piezoelectric, and Hall effect.

There is no restriction on the type of algorithm used to interpret the sensory data, which may include analytical, numerical, and/or neural network approaches. Within the neural network approach, a variety of network topologies, neuron models, and training algorithms may be used. Some specific examples include: Multilayer perception, with or without feedback; Radial basis function (RBF) network; Hopfield network; Elman network; Stochastic neural network; Continuous time recurrent neural network; Topology and Weight Evolving Artificial Neural Network (TWEANN); Compositional Pattern Producing Network (CPPN), etc. Analytic and/or numerical approaches may also be "hybridized" into a neural network framework, by using their outputs as network inputs (e.g., "features").

The scale and shape of the sensors, including total arc length, diameter profile (e.g., as a function of arc length), and curvature profile are not constrained. The scale, shape, and configuration of the sensing array are not limited. The technology can work over any spatial scale. The number of sensors is not limited.

If a system has the capacity to measure full 3-D force and moment at the base of a whisker and a single point contact is assumed, then the Euler-Bernoulli equation can be integrated (e.g., starting from the base) to compute the full shape of the whisker and the location of the contact point. In certain examples, explicit integration may not be performed. Instead, integration can be performed implicitly (e.g., via a neural net) or partially, for example.

The same algorithmic and neural network techniques can apply equally well to deformable membrane surfaces (e.g., skin). Such a membrane can be covered or embedded with sensors, and network(s) can learn to infer the surface shape from the sensor signals.

3-D surface representation is not limited to any particular mathematical framework. For example, representations can be applied to frameworks such as 3-D contact point collections, tri-meshes, geometrical primitives, radial basis function network, artificial neuronal place cell firing rates, etc.

Classical elasticity theory can be used to model a whisker element W as a cylindrical beam bending against a rigid, motionless object (shown in FIG. 1 as peg P) and to derive a monotonic relationship between radial contact distance d, a pushing angle θ, and moment M (e.g., torque) at a whisker base (see FIG. 1). Through either rotation or translation (or a combination of these motions) of the whisker at or near the base region thereof (where the moment sensor resides) against an object, an initial point that the whisker touches along the object during the whisker's movement can be computed. The derivation can alternately be conducted in terms of force instead of moment, and/or translation instead of rotation. Although description is provided with respect to determining a change in moment at the base region of the whisker element as a result of bending, this is offered for purposes of illustration and not limitation. Other examples can be practiced by determining a change in curvature or other deflection of the whisker element at the base region (or other region). The whisker element, the object, or both can be moved to provide relative motion there between.

Each whisker rotates or translates about its base, where the bending moment and/or force are measured. It can be convenient, but it is not necessary, to allow all whiskers to rotate or translate in unison, thus allowing for a simple array design that requires only a single motor for actuation. A change in contact point location can be incrementally inferred through continuous measurement of torque (e.g., bending moment) at the whisker base. Each whisker rotates or translates about its base, where the bending moment is measured. It can be convenient, but it is not necessary, to allow all whiskers to rotate or translate in unison, thus allowing for a simple array design that requires only a single motor for actuation.

There are two ways, for example, that a whisker can slip along an object. Lateral slip occurs when the object surface at the contact point is slanted relative to the plane of rotation and the angle of the friction cone is not large enough to prevent out-of-plane movement. Longitudinal slip occurs when the curvature of the object within the plane of rotation at the contact point is finite (e.g., not a point-object or an object's corner). Conveniently, longitudinal slip affords the opportunity to sense additional contact points as the whisker slips along the object periphery, providing further information about object shape over a single whisk.

The above definitions of lateral and longitudinal slip describe the movement of the contact point along the object in Euclidean space. The contact point can also move along the whisker, even in the absence of lateral and/or longitudinal slip. For example, if a whisker rotates in a plane against a point object, the location of contact on the whisker will change, but the location of object contact will remain constant. This type of contact-point movement on the whisker is termed axial slip.

In certain examples, consistently reliable object distance extraction in the presence of significant surface slopes includes a reasonable estimate of a friction coefficient between a whisker element and an object. There are three methods, for example, by which an estimate of friction can be obtained. First, if an orientation of the entire whisker array can be tilted along an x-axis of any particular whisker, whisks can be performed against the object at a variety of orientations, effectively adjusting the surface slope. A range of slopes is provided for which $\phi=0°$ would be equal to $2\alpha$ (the accuracy depending on how gradually the orientation was adjusted). This essentially amounts to an in-field test of the object to determine the friction coefficient, where $\alpha$ represents a friction cone angle. Second, an array can explore an object and repeat feature extraction to transform contact points into a 3-D object shape (e.g., splining) using a range of friction coefficients. The one that leads to the most consistent contact point positions and thus the smoothest surface is kept. Third, the array can whisk against the object at a variety of array orientations. All the contact points sampled are given a confidence measure related to $\phi$, such that points with large $\phi$ are ignored or have less influence on the feature extraction algorithm. Note that methods 1 and 2 assume the friction coefficient is consistent over the entire object, while method 3 does not.

In some examples, contact can occur at the whisker tip or end. Such cases may result in increased rotational compliance, causing an estimate of object distance, $d_x$, to be greater than the whisker length. A solution is to give $d_x$ a threshold equal to the whisker length. It is also worth noting that regions of an object that are concave with respect to the plane of whisker rotation can be sampled through tip contact with a straight whisker. Tip contact thus can be desirable for at least two reasons: it potentially helps provide a very precise measurement of contact distance (since the whisker length is fixed) and allows concave regions of an object to be sampled.

For example, a coordinate system can be used to identify contact points between the whisker or filament and a surface. In certain examples, the coordinate system is identical to spherical coordinates except that $\varphi$ is measured from the x-y plane instead of from the z-axis. Here, $r_{cp}$ indicates a straight-line distance from the base of the whisker to a location of the contact point (cp), a coordinate $\theta_{cp}$ represents the angular location of the contact point in the horizontal plane, and a coordinate $\varphi_{cp}$ represents the elevation of the whisker as measured from the x-y plane. Together, $r_{cp}$, $\theta_{cp}$, $\varphi_{cp}$ define the contact point in 3-D space of the whisker/filament.

Voltages collected from a sensor connected to the whisker/filament during deflections can be used to determine proportional My, Mz and Fx components at the base of the whisker. My and Mz are transverse moments about the whisker and Fx is the axial force along the length of the whisker. An $M_B$ (magnitude of the bending moment) and $M_D$ (direction of the bending moment) are analytically calculated as shown in Equations (2) and (3) from the transverse moments acting at the whisker base:

$$M_B = \sqrt{M_y^2 + M_z^2}, \quad (2)$$

$$M_D = \tan^{-1}\left(\frac{M_z}{M_y}\right). \quad (3)$$

Here, a spherical-like coordinate system is used to link a 3-D contact point location on the whisker with respect to the base of the whisker. Together, $r_{cp}$, $\theta_{cp}$, and $\varphi_{cp}$ define the 3-D contact point location. Each deflection causes a resultant moment and force at the base of the whisker which can be decomposed into 3-D components. My and Mz can be used to calculate $M_B$ and $M_D$ according to Eqs. (1) and (2). Calculated $M_B$, $M_D$ and Fx can be compared to simulated results using 3-D simulation software for whisker deformations, for example.

True bio-inspired object localization can be accomplished once a unique mapping is established between the coordinate system and the resultant moments and forces. Data can be collected for each (r, θ, φ) position of the whisker on a peg board, averaged over 0.2 seconds, for example. Each sensor output can be normalized between −1 and 1, for example. Linear combinations of these normalized sensor outputs are proportional to My, Mz, and Fx. Using Equations (2) and (3), $M_B$ and $M_D$ can be determined from My and Mz. $M_B$, $M_D$, and Fx were also normalized, between 0 and 1 for $M_B$, −1 and 1 for $M_D$, and −1 and 0 for Fx.

In certain examples, a neural network approach can be used to quantify the quality of a mapping between mechanical signals (F and M) at the whisker base and the contact point location. First, deflection of the whisker can be simulated to all possible contact points ($r_{cp}$, $\theta_{cp}$, $\varphi_{cp}$) on the pegboard. The simulation generates $M_B$, $M_D$, Fx as outputs. Second, a neural network can be executed to find a "mapping" between the mechanical signals and the contact point. This mapping is a look-up table, for example, that provides the relationship between every triplet ($M_B$, $M_D$, Fx) and its uniquely associated contact point ($r_{cp}$, $\theta_{cp}$, $\varphi_{cp}$). Third, experimentally measured values for $M_B$, $M_D$, Fx can be inserted into the lookup table to determine a predicted valued for the contact point. The mean squared error between predicted contact point (from the lookup table) and actual contact point (measured experimentally) can be taken to be the quality of the 3-D contact point determination, for example.

Example Manufacturing Procedure

Certain examples evaluate a multitude of different manufacturing processes and materials to determine what method could produce the best artificial rat whisker. Table 5 provides a quantitative measure of the success of various manufacturing methods using a suitable material. For example, PolyCarbonate (PC), PolySulfone (PSU), Polymaker® PC-max™ (PC-Max) and Stratasys® m30i™ (m30i), etc., can be used. Injection Molding (IM)(30), Vacuum assisted micromolding (VAM)(31), fused deposition modelling (FDM), and surface conforming fiber drawing (SCFD) are manufacturing processes that can be suitable for rat whisker manufacture. Example manufacturing process/material combinations can be assessed on a numerical scale from 1-5 (where 1 is poor and 5 is excellent), for example. The 'material properties' score is a measure of a manufacturing process/material combination to mimic the properties of a real rat whisker. 'Taper quality' measures how well the process is expected to create a linearly tapered whisker. 'Whisker dimensions' assesses the dimensional accuracy and the range of aspect ratios that are achievable. The 'Developable' score is determined by how much the process can be developed to improve whisker quality. 'Scale' is the ability of the method to scale and produce multiple whiskers at once. 'Cost' is the expense to set up and run a manufacturing process. 'Repeatability' is the ability of a process to reliably create whiskers with intended dimensions.

Table 5 illustrates a summary of outcomes from the investigation into manufacturing processes and materials. Each method is ranked on a scale of 1-5 where 1 is poor and 5 is excellent.

| | Whisker Quality | | | Manufacture Process | | | | |
|---|---|---|---|---|---|---|---|---|
| Method/Material | Material Properties | Taper Quality | Whisker Dimensions | Developable | Scale | Curvature | Cost | Repeatable | Total |
| IM/PC and PSU | 3 | 3 | 2 | 2 | 5 | 2 | 1 | 5 | 23 |
| VAM/PC | 5 | 5 | 3 | 3 | 4 | 3 | 1 | 5 | 29 |
| FDM/PC-Max | 4 | 1 | 3 | 2 | 3 | 4 | 3 | 2 | 22 |
| FDM/m30i | 4 | 1 | 3 | 2 | 3 | 4 | 3 | 2 | 22 |
| FC/PC-Max | 4 | 2 | 2 | 4 | 4 | 4 | 5 | 4 | 29 |
| FC/m30i | 4 | 2 | 2 | 4 | 4 | 4 | 5 | 3 | 28 |
| SCFD/PC-Max | 4 | 4 | 5 | 4 | 4 | 4 | 5 | 3 | 33 |

From the scores given in Table 5, surface conforming fiber drawing (SCFD), vacuum assisted micromolding, etc., can be used in the development and manufacture of artificial rat whiskers.

Example Whiskers

Artificial whiskers produced via SCFD demonstrate the required ability to be deflected 90° and return to their original profile. In certain examples, whiskers made from Stratasys® m30i™ and Polymaker PC-max™ are able to undergo a 90° deflection before rapidly returning to their pre-deformed state. Repeated use of the whiskers shows no inclination to plastically deform.

In certain examples, SCFD can produce whiskers with a wide variety of geometries. Variance in profiles of produced whiskers can be measured by digitizing the whisker at high resolution then measuring the whisker to extract a profile of a reduction in whisker diameter along the length of the whisker. Profiles of different whiskers can be compared by normalizing the length and diameter of each whisker by the base diameter (e.g., 1.76 mm, etc.) of the whiskers. A wide range of tapers can be obtained using manufactured whiskers. By determining a whisker profile, the whisker can be trimmed to a desired region and used in a sensor array, for example.

In certain examples, to produce whiskers targeting the dimensions in Table 1, an applied load and heated length can be optimized for each type of whisker, and then filaments are drawn. A point along the taper of the filament at which a desired base diameter is reached can be marked and the desired whisker length can be measured from that point and also marked. The filament is then trimmed at both of the marked locations to produce the desired base diameter and whisker length, as well as the resulting tip diameter (d). When the base diameter and whisker length are kept constant within whisker archetypes, variance in the $R_{slope}$ is the result of changes in the tip diameter and taper profile, for example.

Table 6 illustrates examples of whisker tip diameters produced with whisker drawing that targeted the dimensions presented in Table 1. R refers to Rostral whiskers; C refers to Caudal whiskers:

| No. | Tip Diameter (μm) | Rslope (—) |
|---|---|---|
| R1 | 20 | 0.0018 |
| R2 | 80 | 0.0015 |
| R3 | 70 | 0.0015 |
| R4 | 60 | 0.0016 |
| R5 | 60 | 0.0016 |
| R6 | 80 | 0.0015 |
| R7 | 70 | 0.0015 |
| R8 | 30 | 0.0017 |
| R9 | 80 | 0.0015 |
| R10 | 70 | 0.0015 |
| R11 | 30 | 0.0017 |
| R12 | 160 | 0.0011 |
| R13 | 180 | 0.0010 |
| R14 | 110 | 0.0013 |
| R15 | 160 | 0.0011 |
| R16 | 110 | 0.0013 |
| R17 | 110 | 0.0013 |
| R18 | 180 | 0.0010 |
| R19 | 160 | 0.0011 |
| R20 | 60 | 0.0016 |
| R21 | 70 | 0.0015 |
| R22 | 110 | 0.0013 |
| R23 | 30 | 0.0017 |
| R24 | 180 | 0.0010 |
| R25 | 210 | 0.0008 |
| R26 | 200 | 0.0009 |
| R27 | 160 | 0.0011 |
| R28 | 180 | 0.0010 |
| C1 | 120 | 0.0015 |
| C2 | 130 | 0.0015 |
| C3 | 110 | 0.0015 |
| C4 | 130 | 0.0015 |
| C5 | 220 | 0.0013 |
| C6 | 100 | 0.0016 |
| C7 | 130 | 0.0015 |
| C8 | 140 | 0.0015 |
| C9 | 80 | 0.0016 |
| C10 | 180 | 0.0014 |
| C11 | 70 | 0.0016 |
| C12 | 180 | 0.0014 |
| C13 | 100 | 0.0016 |
| C14 | 110 | 0.0015 |

Dimensions of the produced whiskers exceed or meet the geometric requirements set in FIG. 3 above. A wide range of aspect ratios from 35 to 264 and Base/Tip ratios of 2 to 93 can also be achieved beyond the geometries listed above, demonstrating the ability of SCFD to produce a range of whisker geometries. In certain examples, different cylindrical filament diameters can be used to produce whiskers with a wider variety of base diameters. In certain examples, additional control can improve the profile of a manufactured whisker such that a greater proportion of the taper is linear.

In addition to manufacturing an artificial whisker, an artificial follicle can be used to detect the magnitude and direction of deflections of the artificial whisker. To attach the whisker to the sensor, each whisker can be threaded onto a screw (e.g., a cap screw, etc.), for example. Strain gages can be used to measure the force generated by whisker deflections.

Macro-Scale Material Characterization

Processing-Structure-Property Relationship

A processing-structure property (p-s-p) relationship is a paradigm that provides the foundation for materials science. The p-s-p relationship is poorly defined for polymers, particularly polymer composites and nanocomposites. The mechanical requirements of the whisker (FIG. 3), are well suited to engineering polymers, for example. In certain examples, manufacturing parameters can be adjusted based on an understanding of how the mechanical properties of the final whisker structure are dependent on the manufacturing process and the material components used in order to produce a whisker with optimal performance.

In certain examples, a combination of macro and nanoscale techniques are used to characterize the mechanical properties of polymeric materials. A nanoscale quantitative nanomechanical mapping (QNM) via atomic force microscopy (AFM) and scanning electron microscopy can provide data on the local mechanical properties and microstructure of polymers and polymer composites, for example. A macroscale dynamic mechanical analysis (DMA) can be used to assess the viscoelastic properties of polymers in a variety of loading conditions including three-point bending and tensile loading, which are expected to be the dominant modes during whisker operation, for example. A combination of nanoscale and macroscale techniques can be used in conjunction to establish the relationship between the microstructure of the polymer and the macroscale mechanical properties and understand how this relationship is influenced by the manufacturing procedure.

Certain examples provide a method to manufacture artificial rat whiskers to the prescribed specifications. First, a wide array of possible manufacturing method and material solutions are identified and compared to assess their potential to produce functional whiskers. In certain examples, surface conforming fiber drawing is a modified drawing technique used with ABS (acrylonitrile butadiene styrene) and polycarbonate filaments to manufacture the artificial whiskers. Geometric and mechanical properties of the artificial whiskers can be characterized at several length scales. In certain examples, the material stiffness of the polycarbonate whiskers increases as a result of the processing due to two mechanisms: coalescence and particle migration. Microstructural changes and resulting gradient in mechanical stiffness along the length of individual whiskers influences the artificial whisker as a haptic sensor, for example.

Viscoelastic Behavior

In certain examples, 3-D printable Acrylonitrile butadiene styrene (ABS) and polycarbonate provide viscoelastic properties across a range of temperatures to establish a glass transition temperature and exhibit a certain mechanical performance at elevated temperatures (e.g., ABS and polycarbonate exhibiting a Storage Modulus (E'), Loss Modulus (E"), and Tan δ for (a) Stratasys® M30i™ and (b) Polymaker® PC-max™ at different temperatures between room temperature and 140° C. for a constant frequency of 1 Hz, etc.).

In certain examples, a measured glass transition temperature is similar for both the Stratasys® M30i™ (~119° C.) and the Polymaker® PC-max™ (e.g., ~113° C., etc.). Both of the measured glass transition temperatures are much greater than room temperature and both have a comparatively low loss modulus compared to the storage modulus at temperatures below 80° C., for example. A combination of low loss modulus and high glass transition temperature indicates that both materials have a fast response time after deflection and return to a predeformed state quickly in a range of operating conditions.

Tensile Elastic Behavior

In certain examples, the ABS and polycarbonate exhibit quasi-static behavior. At a constant strain rate (e.g., 0.05 s−1, etc.), the viscoelastic properties of the two materials produce a non-linear elastic region. A Young's modulus can be calculated by measuring a stress-strain gradient from 0% to 1% strain, for example. A table of basic elastic properties for the ABS and polycarbonate is provided in Table 7.

Table 7 provides example quasi-static properties of stock Polymaker PC-max and Stratasys PC-max filament

| Material | Elastic Modulus (GPa) | Ultimate Tensile Strain (%) | Ultimate Tensile Strength (MPa) | Elongation at break (%) |
|---|---|---|---|---|
| Polycarbonate | 1.88 | 2.2% | 28.5 | 43.8 |
| ABS | 1.66 | 5.2% | 49.1 | 8.7 |

Both ABS and polycarbonate materials exhibit large amounts of plastic flow, with a large amount of post-yield deformation. For example, plasticizers can be added to 3-D printable polymers to improve the processing capability of the material. Measured Tg of Stratasys® M30i™ (ABS) and Polymaker® PC-max™ (polycarbonate) are significantly lower than the equivalent conventional polymer, respectively, which supports the conclusion that the addition of plasticizers significantly alters the mechanical and viscoelastic performance of these materials.

Structural Characterization

Local Variance in Bending Stiffness

Figure 7:
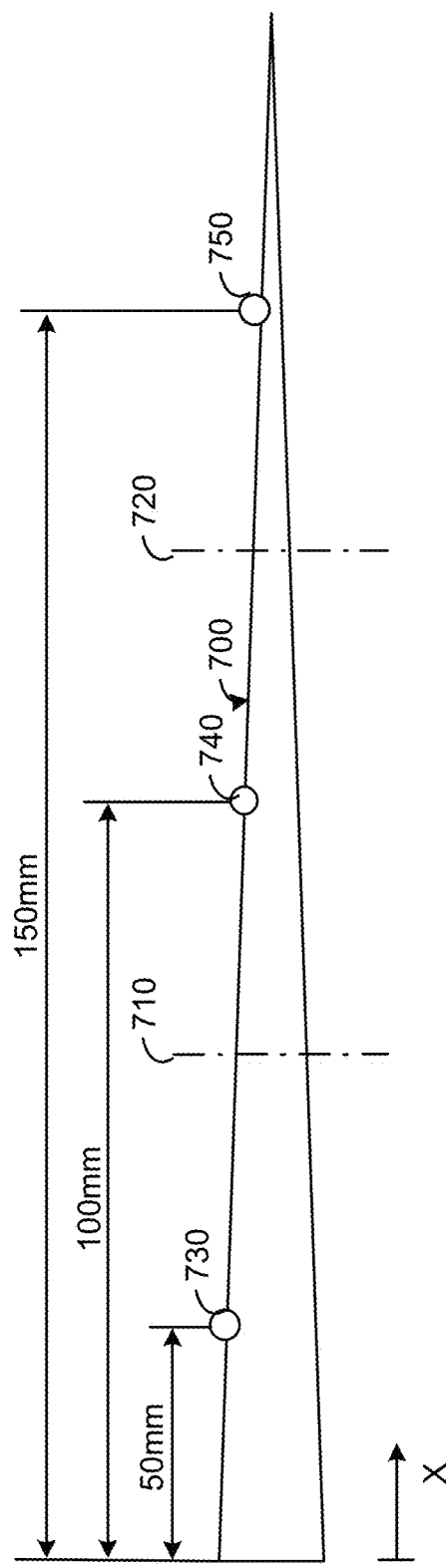
FIG. 7 depicts an example discretization of an artificial whisker for analysis of local variance in bending stiffness.

The developed artificial rat whiskers are a functional structure, with the mechanical properties of the geometry central to the performance and function of a whisker sensory device. An example mode of operation of the whisker is in bending as a result of whisker operations. To investigate if a whisker produced via SCFD from Polymaker® PC-max™ varies in mechanical properties along its length, samples (e.g., 15 mm long, etc.) taken from several locations along the length of a whisker can be selected and strained under three-point bending conditions. For example, a loading point for testing can be at 50 mm, 100 mm and 150 mm from the base of the whisker. FIG. 7 depicts an example discretization of an artificial whisker 700 for analysis of local variance in bending stiffness. Dash black lines 710, 720 indicate where the whisker 700 is separated. Circles 730, 740, 750 indicate load points during experiments at 50 mm, 100 mm, and 150 mm.

In certain examples, a strain sweep can be conducted on samples with a lowest bending strain tested at 0.01% and a highest bending strain tested at 1%. The samples are tapered along their length as a result of the drawing process, introducing a non-linearity into the sample geometry. To approximate the cross-section, the diameter of a sample can be measured at each end as well as the center of the sample, and diameters can then be averaged. In certain examples, below a strain amplitude of 0.4%, the storage modulus may not be consistent. Above ~0.4% strain, the experimentally measured storage modulus may not vary significantly across the range of strain amplitudes examined, for example. In an example, the measured storage modulus may increase for samples taken further away from the base of the whisker with a 37% increase in storage modulus measured between a sample taken near the base of a whisker (x=50 mm) compared to the storage modulus of a sample taken near the tip (x=150 mm).

In certain examples, changing geometry of the whisker is accounted for, so the increase in storage modulus that is observed is a change in material properties along the whisker. A strain sweep under three-point bending conditions can provide an increase in stiffness along the length of the whisker, for example. In certain examples, a consistent increase in storage modulus is observed along the length of each whisker with anywhere between a 30-45% increase stiffness compared to the stock filament. In certain examples, the resulting modulus of a SCFD whisker is within the desired range specified in FIG. 4.

Microstructure Characterization

In certain examples, quantitative nanomechanical property mapping (QNM), scanning electronic microscopy (SEM), and/or atomic force microscopy (AFM) can be used to provide nanoscale analysis of local mechanical property data for a whisker manufactured using SCFD. Using AFM, for example, microstructure of the whisker can be analyzed. By binarizing the produced image to differentiate between the soft phase and the stiff phase, an estimate of an area fraction of the scan that includes filler can be determined. By measuring a number of pixels in each filler particle, a spectral distribution of the filler area is produced. The spectral distribution suggests a mild increase in average filler particle size along the length of the whisker, for example.

Particle analysis demonstrates a slight increase in particle size as well as broadening in size distribution near the tip of the whisker or filament. Coupling of a higher concentration of soft filler phase closer to the tip of the whisker and the decreased diameter suggests that the macroscale stiffness would decrease. However, the storage modulus of segments from the middle of drawn whiskers is systematically higher compared to the storage modulus of whisker segments taken near the whisker base. Scanning electron microscopy (SEM) analysis shows that particle coalescence and migration can cause the microstructure to develop along the length of the whisker from an initially homogenous distribution of soft phase at the base to a cross section devoid of soft filler at the tip (schematized in an example of FIG. 8). Such development can occur because the filler particles at the tip of the artificial whisker can often stay above the glass transition temperature for a longer period of time and have more opportunity to coalesce and migrate along the longitudinal whisker axis. This can cause a gradual change in the mechanical properties along the whisker and result in particle-deficient regions within 50-100 μm of the whisker surface. Eventually, all the filler can migrate to the longitudinal axis, while the whisker continues to draw, creating a volume near the tip that only consists of polycarbonate and miscible additives. These factors show why the macroscale stiffness can increase near the tip rather than decrease in comparison to the base of the artificial whisker, for example.

Figure 8:
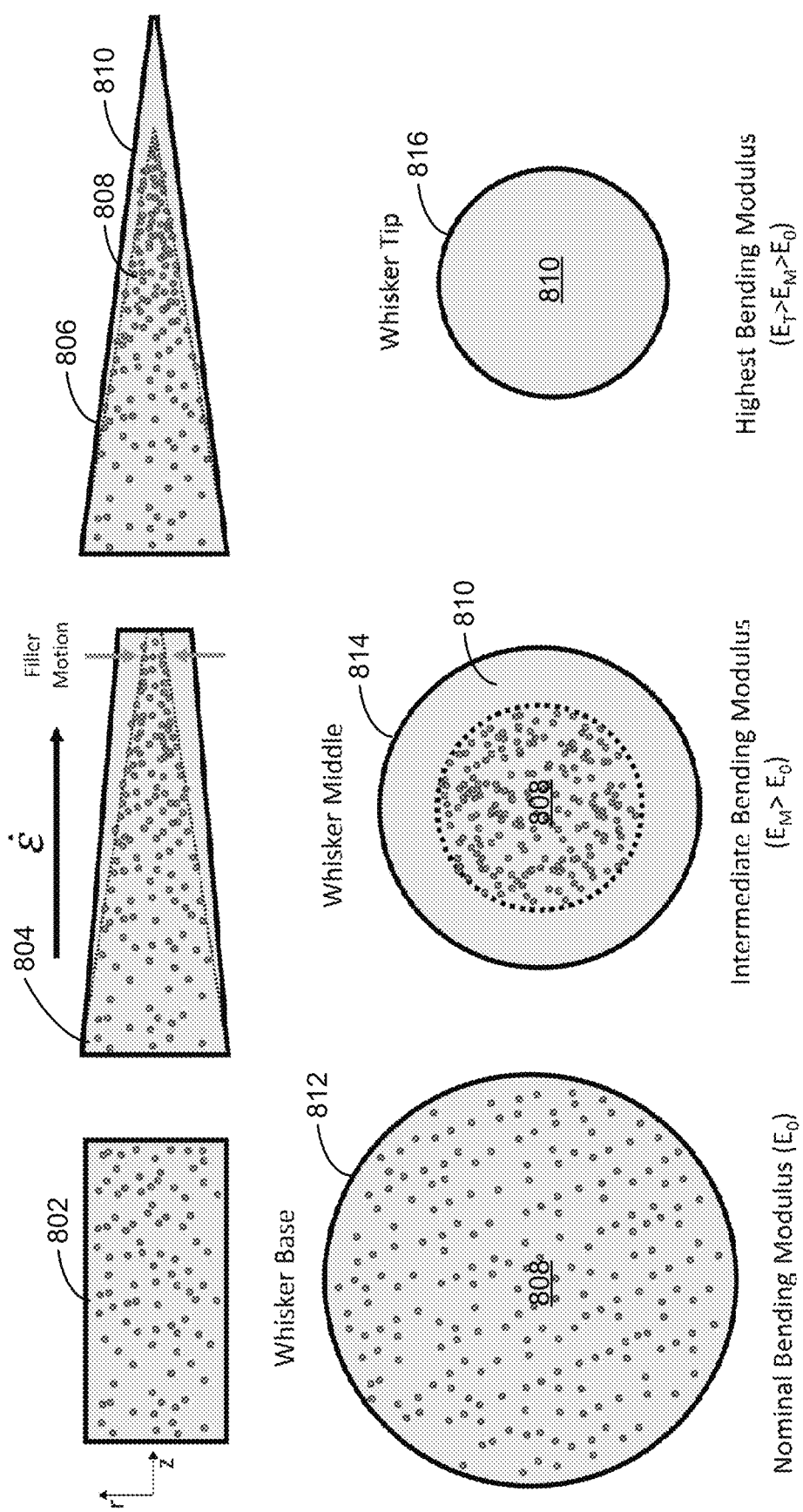
FIG. 8 illustrates example changes in microstructure along a filament as the filament is drawn to form a whisker.

Using SEM, for example, microstructures in a cross-section of the whisker can be imaged and investigated to observe filler distribution, for example. In some examples, such as shown in FIG. 8, throughout most of the cross-section the filler microstructure is uniform, without much spatial variance. Near the edge of the whisker cross section there are several distinct changes to the microstructure of the whisker material. In an example, underneath the whisker surface, there is a filler-deficient band of polycarbonate approximately ~30 μm wide with sparsely distributed large filler particles. Concentric to this filler deficient ring, there is another ring ~40 μm of coarse filler particles in the example. Moving beyond this region towards the whisker center, the microstructure is homogenous, for example.

The development of polymer microstructure can also be examined along a length of a manufactured whisker, for example. In some whisker cross-sections (e.g., located approximately 50 mm from the base of the whisker, etc.), a filler deficient zone can be found (e.g., approximately ~50 μm wide, etc.) but no band of coarse filler particles are observed. Further along (e.g., ~100 mm from the whisker base, etc.), both a filler-deficient band and a band with coarsened particles can be observed. Near the tip of the whisker (e.g., 150 mm), the cross-section examined may appear relatively homogenous with no obvious filler particles, for example.

In certain examples, the microstructure develops along the length of the whisker. Based on this microstructure, an increase in whisker stiffness results from soft filler particles migrating away from the whisker edge and, therefore, contributing less to the mechanical stiffness of the whisker in bending towards the tip of the whisker compared to the base. This effect is complicated by convoluting effects (e.g., gravity, thermal gradients, etc.) that occur during processing, resulting in the asymmetrical development of the microstructure.

In certain examples, local changes in microstructure at the edge of a whisker can be explained by two mechanisms that work in conjunction. A filler deficient region results from filler migration towards the neutral axis of flow (e.g., the center of the filament). The migration of filler particles towards the neutral axis of flow is shown to occur very quickly initially and then slow down after certain period of time, for example. The effect is also more significant further away from the neutral axis, resulting in a filler-deficient region since filler particles have migrated a short distance away from the whisker edge towards the whisker center.

In certain examples, a coarsening of the filler particles results from a 'coalescence' which occurs in immiscible polymers under shear and extensional flow. Under the right flow conditions, a coalescence involves soft particles in a viscous matrix colliding and combining to form larger particles. The rate of coalescence is inversely proportional to the Capillary number (Ca). The capillary number is defined in Equation (4):

$$Ca = \frac{R\eta_m \dot{\varepsilon}}{\sigma}, \quad (4)$$

where R is a radius of a particle, $\eta_m$ is a viscosity of a matrix fluid, $\dot{\varepsilon}$ is an extensional strain rate (and is interchangeable with shear strain rate ($\dot{\gamma}$)), σ is a surface tension between the filler particle and the matrix. Equation (5) provides a model to predict a probability of a coalescence event occurring when two particles collide as a function of flow and material properties:

$$P_c = \exp\left(-\frac{3Ca^2 R^2}{2h_c^2(1 + 3C\eta_m/\eta_d)}\right). \quad (5)$$

In Equation (5), $P_c$ is a probability of a coalescence event, $h_c$ is a critical distance between the two droplets below which instabilities will grow and cause the two droplets to rupture and coalesce, C is a ratio of the circulation length to the distance below which hydrodynamic interactions between the drops is considered, and $\eta_d$ is a viscosity of the particle. Filler migration from the filler deficient region to the coalescence region increases the particle concentration locally, for example. The higher particle concentration increases the frequency of particle-particle collisions, resulting in more opportunities for coalescence locally. Therefore, the rate of coalescence locally is greater than the bulk of the whisker cross-section causing the local coarsening of filler particles. Coalescence also explains the slight increase in of filler area size, which occurs at the whisker center, but potentially at a slower rate, for example.

Thus, certain examples provide particle migration and coalescence to form biomimetic artificial whiskers from polymers via SCFD. Microstructural changes at a nanoscale level result in a significant alteration of macroscale mechanical properties of the whisker and allow the whisker to be a suitable bio-mimetic. A resulting artificial whisker can be used in conjunction with a robotic sensory system to provide haptic and/or other tactile feedback and a mechatronic analogue to the biological neuro-sensory pathway observed in an animal such as a rat, for example. Certain examples provide a novel manufacturing technique termed surface conforming fiber drawing (SCFD) to produce tapered filaments from cylindrical filament made out of thermoplastic polymers such as polycarbonate, ABS, etc. Polymers can be modified with plasticizers to provide processability and ability to elastically deform as artificial whisker material, for example. Mechanical and geometric properties of produced whiskers can be characterized to understand how the whiskers function during operation.

In an example, whiskers manufactured from the polycarbonate have a larger storage modulus under bending at the tip of the whisker compared to the whisker base in a similar manner to biological vibrissae for example. A nanoscale analysis of the whisker microstructure indicates that this was a result of soft filler particles migrating away from the whisker surface towards a center of the whisker during the SCFD process.

FIG. 8 illustrates an example mechanism associated a mechanical property gradient distributing filler particles in an example artificial whisker. An example base portion 802 (e.g., whisker base) of the artificial whisker shows an initial distribution of soft filler that is present in a filament before the portion of the filament is drawn or pulled. An example middle portion 804 (e.g., whisker middle) of the whisker illustrates a coalescence and migration of filler particles towards the longitudinal axis of the whisker as an extensional strain is applied to the whisker above Tg. An example tip portion 806 (e.g., whisker tip) shows that, past a critical drawn length, no more filler 808 is available, while the polycarbonate matrix 810 continues to draw, producing a homogenous cross-section near the whisker tip 806. As shown in example cross-sections 812-816, as filler 808 migrates from the outer edge of the whisker to the longitudinal axis, the local bending modulus 812-816 increases as the exterior filler-deficient band 810 carries a greater proportion of a bending load.

Example Material Selection

Due to various factors, polycarbonate has been determined to be most suitable for the manufacturing of the tapered artificial whiskers. Among the factors considered were its elastic modulus and its capability to elongate before breaking greater than many other tested polymers. Additionally, in compared to many polycarbonates, Polymaker® PC-Max™ has a lower glass transition temperature, increased ability to flow when melted, and increased material ductility. These factors are ideal for manufacturing tapered artificial whiskers. When testing the creep behavior of a SCFD manufactured whisker, PC-max™ exhibited an initial drop of the transient modulus of approximately 10%, and then remained approximately constant for the duration of the 2000 second long test for example.

Other Example Manufacturing Processes

Figure 9:
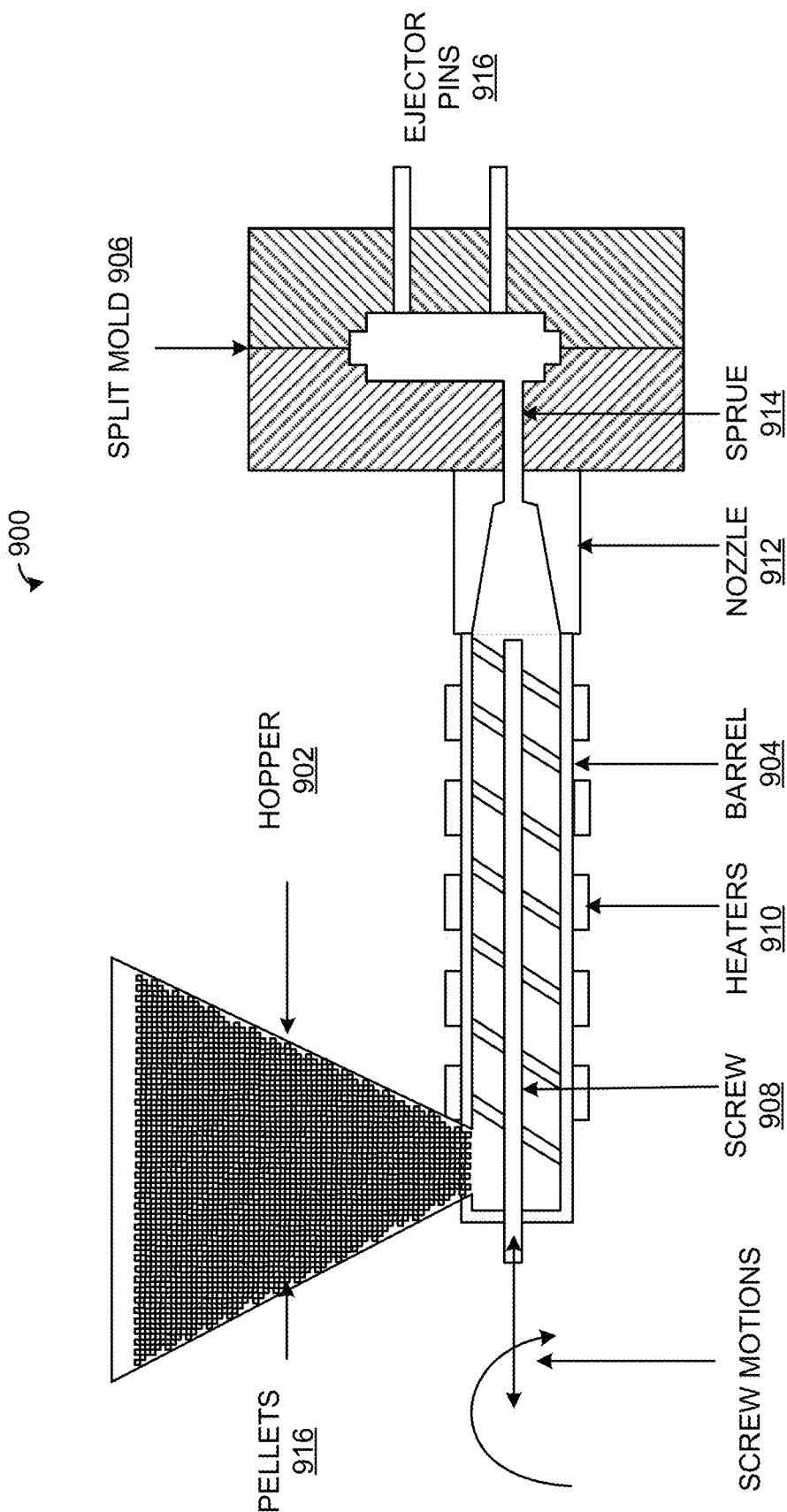
FIG. 9 illustrates an example injection molding system used to produce artificial tapered whiskers.

As described above, one or more manufacturing processes can be used to generate whisker tapers, such as Conventional Injection Molding (IM), Vacuum assisted Micromolding (VAM), 3-D printing (3DP), Polymer Melt Pulling (PMP), Foil Casting (FC), Surface Conforming Fiber Drawings (SCFD), etc. FIG. 9 illustrates an example injection molding system 900 used to produce artificial tapered whiskers. As shown in the example of FIG. 9, pellets 916 of a chosen material are fed from a hopper 902 through a heated barrel 904 that melts the plastic pellets 916 and forces them into a mold 906. A screw 908 turns and forces the pellet materials 916 through the barrel 904 as the barrel is heated by heaters 910 to melt the pellet material 916. The melted pellet material 916 is fed through a nozzle 912 into a sprue 914 of the mold 906. Excess melted pellet material 916 can be ejected from the mold 906 via ejector pins 916. Once a model design has been made, injection molding allows the production of cheap, repeatable parts.

Figure 10:
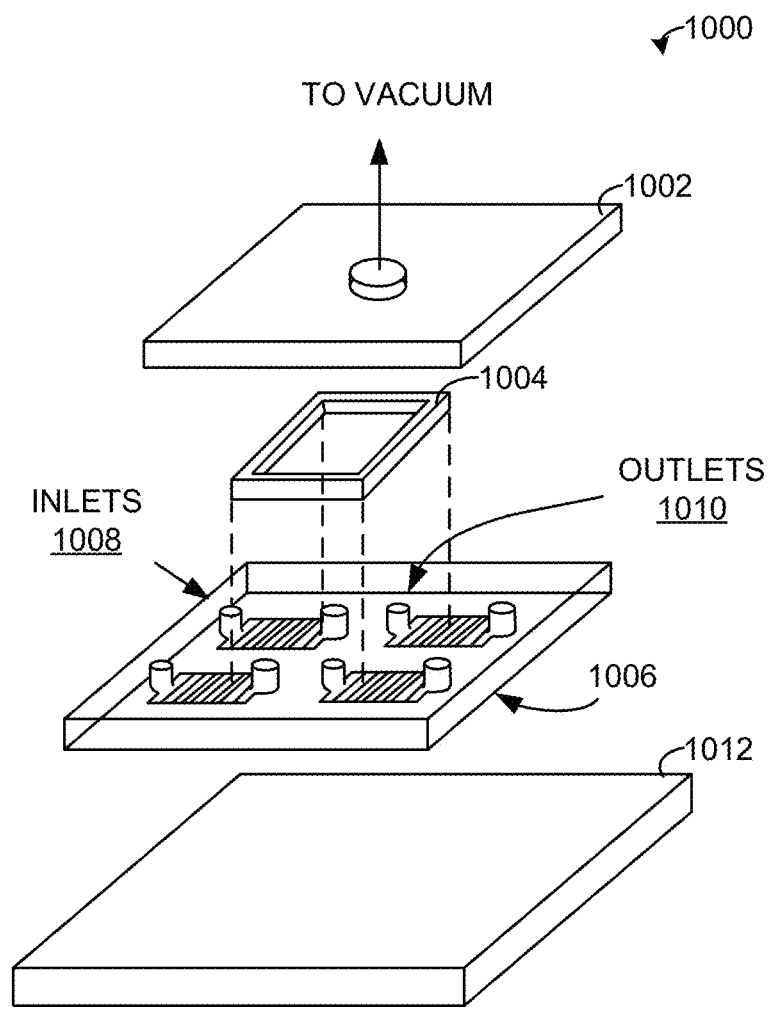
FIG. 10 illustrates an example vacuum-assisted micromolding apparatus used to produce artificial tapered whiskers.

A molding process that can create microscale features is vacuum-assisted micromolding (VA MIMIC). A schematic illustrating this example system 1000 and associated process is shown in FIG. 10. The example apparatus 1000 includes a rigid plate 1002 arranged with respect to a Polydimethylsiloxane (PDMS) membrane gasket 1004, which is a barrier to liquids but allows certain gases to pass through. A PDMS mold 1006 includes a rigid plate with holes forming inlets 1008 and outlets 1010 through which material can be routed for molding. Underneath the mold 1006 lies a substrate 1012, for example. Photosensitive resin is drawn through the microscale channels 1008, 1010 with a vacuum applied to assist with capillary filling. Only a low vacuum (~10 torr) is required to obtain significant improvement in the channel filling time, for example. Such a process can be used to develop a molding process that can cope with the micron sized dimensions at the tip of the whisker, for example.

Figure 11:
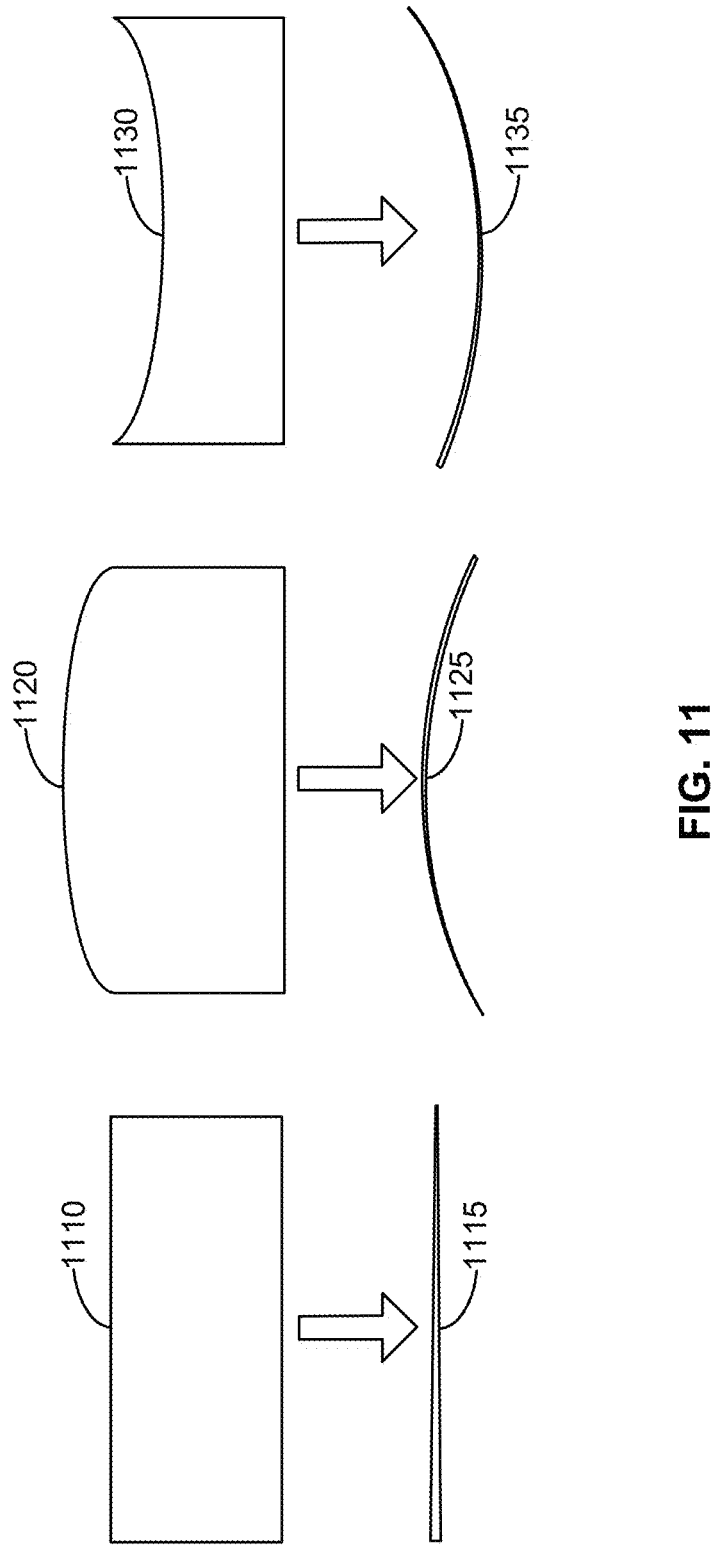
FIG. 11 illustrates example heated surface geometries forming curvature in artificial whiskers.

An ability to repeatedly create an intrinsic curvature in an artificial whisker is also desirable. In certain examples, curvature is added to a whisker in a post-drawing, thermoforming action. Alternatively, as shown in the example of FIG. 11, a geometry of a heated surface 1110, 1120, 1130 can be altered so that the surface is curved. A filament that softens and adheres to the curved surface adopts the surface geometry as shown in the example of FIG. 11. In this way, whiskers can be created with a repeatable intrinsic curvature 1115, 1125, 1135 that does not complicate the automation of the manufacturing process. A manufacturing process using a straight surface profile 1110 can result in a linear artificial whisker 1115. Alternatively, using a convex surface profile 1120 to construct an artificial whisker yields a convex curved whisker 1125. Additionally, a concave surface profile 1130 can create a concave curved artificial whisker 1135.

Benefits, Results and Conclusions

Thus, certain examples enable production of haptic sensory devices for mechanical phenotyping of cancer and other disease in the mouth and throat, etc. Certain examples provide a complementary depth sensor for use in conjunction with computer vision (which has trouble resolving depth). Certain examples provide a haptic sensory device for robots operating in remote/confined/poor-visibility environments where conventional computer vision is not sufficient.

Certain examples can produce tapered filaments with very small tip diameters (e.g., <50 microns, etc.) compared to a base diameter (e.g., ~1.7 mm, etc.). Other technologies cannot produce tapered whiskers with high aspect ratios. Certain examples provide polymers with good mechanical properties along with higher surface quality and smooth (non-digital) taper compared to other geometries such as 3-D printed whisker geometries, etc.

Figure 12:
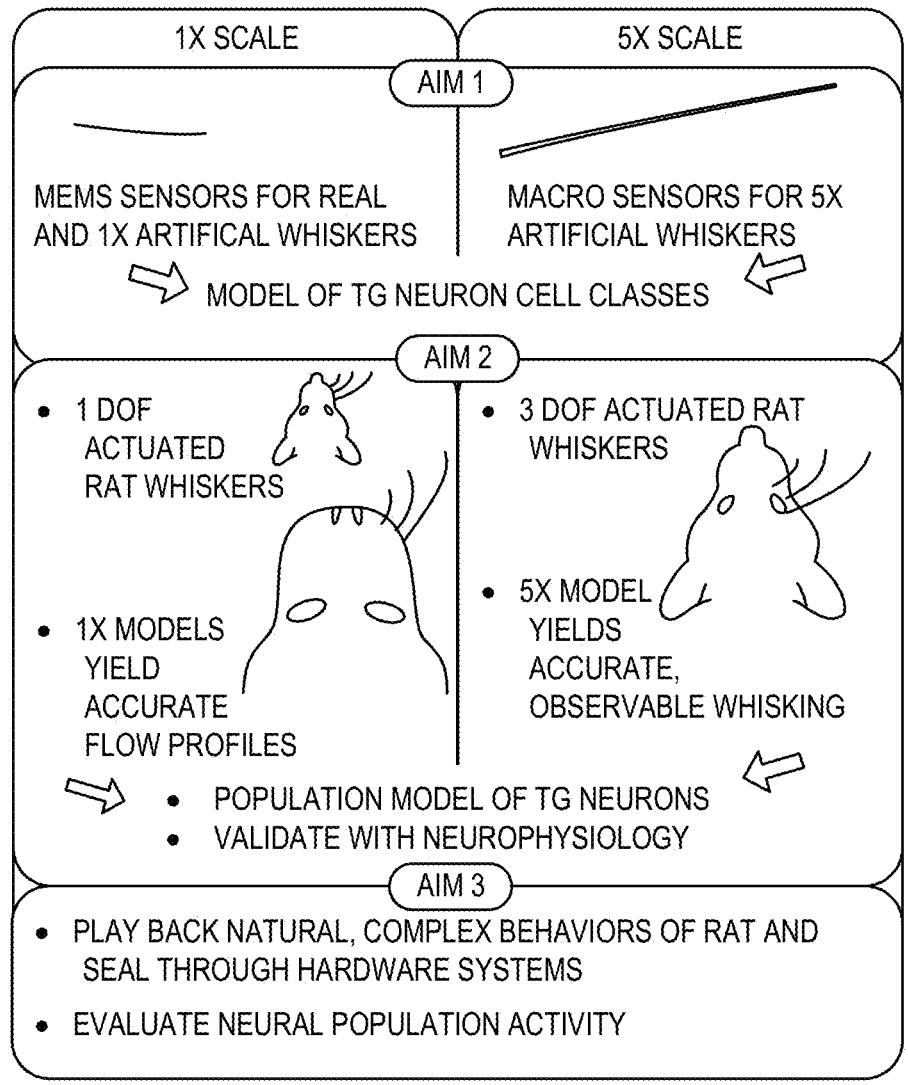
FIG. 12 illustrates example technological development of artificial whiskers and associated models and systems.

Certain examples provide a bio-realistic hardware platform to facilitate a neural basis for sensorimotor control in a vibrissal (whisker) system. As shown in the example of FIG. 12, certain examples provide modular, reconfigurable arrays of whiskers tuned for robust tactile sensing, with signals represented based on coding properties of primary sensory neurons in the trigeminal ganglion (TG). Certain examples construct actuated whisker arrays on morphologically-accurate models of the head of the rat and harbor seal and use the arrays to develop TG neuron population models. Certain examples quantify the TG neuron population response during complex, natural behaviors.

Certain examples include both long whiskers with significant dynamics (e.g., either tapered or not tapered), as well as short stubby hairs that serve more as proximity sensors. Either of those types of hairs (e.g., long or stubby) can be used to extract contours. Instead of or in addition to contour extraction, whisker arrays can be used for contact detection, proximity sensing, force measurement, and the like. Prediction of upcoming contours can be facilitated based on gathered data, for example.

In certain examples, the sensor array can be moved with respect to an object. In certain examples, the object can be moved respect to the whisker(s) of the sensor array. In certain examples, both the array and the object can be moved with respect to each other. Movement of the array can be arbitrary, for example.

Certain examples provide whiskers or other sensor members of various shape, in terms of both curvature profile and diameter profile. Array configurations can be arbitrary, for example. In certain examples, sensor member(s) can include deformable membrane surface(s) (skin) to which neural network techniques are applied. Such a membrane could be covered or embedded with sensors and the networks can learn to infer the surface shape from the sensor signals. In certain examples, an object can be coated with strain gages, and neural networks then learn to infer the object's surface shape (e.g., the object shape) based on the strain gage signals.

In certain examples, the scale and shape of the sensors, including total arc length, diameter profile (as a function of arc length), and curvature profile are not constrained. The scale and shape and configuration of the sensing array are also not limited. The presently described technology can work over any spatial scale. The number of sensors is not limited.

If the system has the capacity to measure the full 3-D force and moment at the base of the whisker and a single point contact is assumed, then the Euler-Bernoulli equation (starting from the base) can be incorporated to compute the full shape of the whisker and the location of the contact point.

The 3-D surface representation is not limited to any particular mathematical framework. Some possible options include 3-D contact point collections, tri-meshes, geometrical primitives, radial basis function network, artificial neuronal place cell firing rates.

Figure 13:
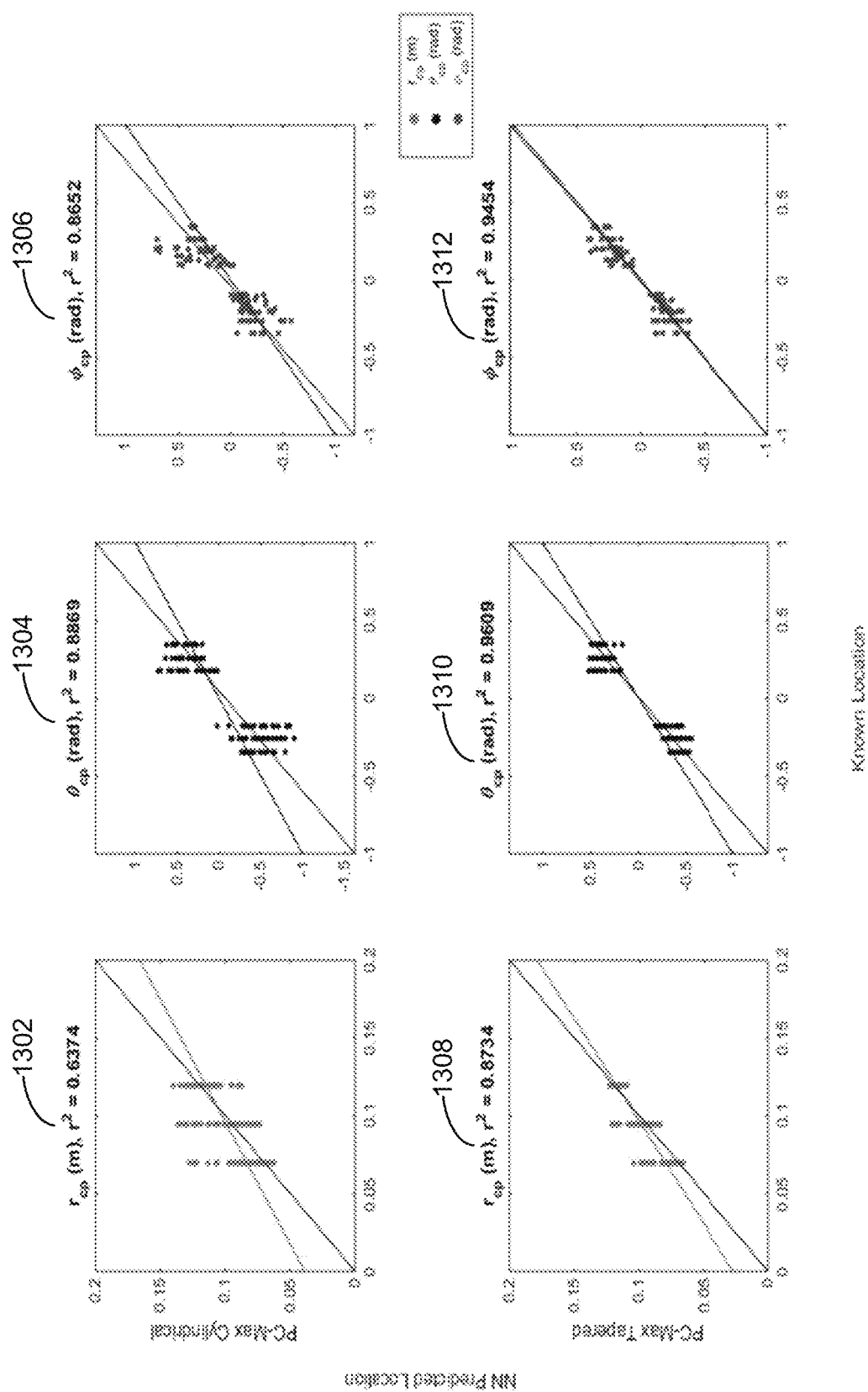
FIG. 13 compares neural network results for the tapered and cylindrical whisker filaments.

FIGS. 13 and 14A-14F show results comparing a tapered whisker to a cylindrical, non-tapered whisker. As shown the results, the tapered profile offers benefits for location sensing not provided by a purely cylindrical design. The example whisker filaments used in FIGS. 13-14F are formed of PC-max.

FIG. 13 compares neural network results for the tapered and cylindrical PC-max whisker. Each plot 1302-1312 shows a known $r_{cp}$, $\theta_{cp}$ and $\varphi_{cp}$ location against what was predicted by a neural network. From left to right, each graph 1302-1312 looks at a particular contact point identifier: $r_{cp}$ (meters), $\theta_{cp}$ (radians), and $\varphi_{cp}$ (radians). The top row shows results for the cylindrical whisker whereas the bottom row shows results for the tapered whisker. Each plot 1302-1312 shows predicted location (as calculated using the neural net) versus actual location (known from experiment).

Across all 3-D contact point locations, the tapered whisker performed superiorly to the cylindrical whisker. For $r_{cp}$, the tapered whisker performed significantly better than the cylindrical whisker. This is mainly attributed to areas of non-uniqueness in the moment and force outputs at the base of the whisker due to the cylindrical geometry. The variance in the neural net results was highest for $r_{cp}$ for both tapered and cylindrical whiskers.

In certain examples, simulations and experimental data are collected and compared for identical 3-D contact points on both cylindrical and tapered PC-Max whiskers. Using random forest regression, FIG. 14A compares the results for these whiskers in uniqueness of mapping and 3-D contact point determination. In the example of FIG. 14A, a histogram of the (Euclidian) distance error (computed as the absolute value of the actual location minus the predicted location) for the cylindrical and tapered whisker is shown. During testing, the PC-Max demonstrated sufficient damping that the sensor input was not affected by excessive vibration after a deflection. On average, the tapered whisker demonstrated a lower distance error across all contact points in the data set. In FIG. 14B, small angles ($\theta$cp or $\Phi$cp<10°) are excluded to account for any "dead-band zone" in the sensor where the experimental data is least likely to match simulation due to the overall sensitivity of the sensor during small deflections. Again, the tapered whisker outperforms the cylindrical whisker for a lower error on average by over twofold.

As a further validation of the results in FIGS. 14A-14B, FIGS. 14C-14F show the results of the simulations for the cylindrical and tapered whiskers. Contact point locations gathered during experiments for both the tapered and cylindrical whiskers of the dimensions specified above can be simulated using a quasi-static whisker bending software. The simulation results for the tapered whiskers are shown in FIGS. 14C-14D. In FIGS. 14D and 14F, a line plot is superimposed over the surfaces for clarity. The insets, however, show the identical surfaces in FIGS. 14C and 14E. In both plots, the figures clearly show separation between the three surfaces (which correspond to the three radial distances tested). In FIGS. 14E and 14F, the simulation results for the cylindrical whisker are shown. Clear overlap of the surfaces is visible in both plots, primarily as the mixed coloring for small magnitude signals in FIG. 14E and the lack of separation in the surfaces of FIG. 14F. This overlap corresponds to a non-uniqueness of mapping for the different combinations of the mechanical signals and can account in part for the increased error exhibited in FIGS. 14A-14B for the cylindrical whisker. This further demonstrates the greater potential for a tapered whisker to perform location sensing over a cylindrical whisker.

The example processes described above can be performed using a processor, a controller and/or any other suitable processing device. For example, the example processes can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of can be implemented using coded instructions (e.g., computer readable instructions) stored on a non-transitory computer readable medium such as a flash memory, a read-only memory (ROM), a random-access memory (RAM), a CD, a DVD, a Blu-ray, a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes can be implemented manually or as any combination(s) of any of the foregoing techniques, for example, any combination of firmware, software, discrete logic and/or hardware. Further, although the example processes may be described with respect to certain flow diagrams, process flows, etc., other methods of implementing the processes may be employed. For example, the order of execution of the blocks can be changed, and/or some of the blocks described may be changed, eliminated, sub-divided, or combined. Additionally, any or all of the example processes can be performed sequentially and/or in parallel by, for example, separate processing threads, processors, devices, discrete logic, circuits, etc.

Certain examples provide detection of a two- and/or three-dimensional surface topography using artificial whiskers as flexible sensors. In certain examples, a sweeping mode algorithm allows for large scale mapping using a relatively small sensor.

In certain examples, whiskers include no sensors along their length, only at the base, the locations of whisker/object contact can be inferred based on torque and/or force information from sensors embedded at the whisker base, perhaps in combination with information relating to whisker movement. Contact point (CP) determination can be accomplished using whisker tapping and/or sweeping. Tapping methods are characterized by the whisker rotating and/or translating by a "small" amount beyond initial object contact, where the "small" constraint is observed to allow use of a linearized cantilever beam model. Sweeping methods involve the whisker moving significantly beyond initial contact, usually leading to a continuous contour of the object (or sequence of CPs) being sampled, and hence allowing shape information to be gathered much more rapidly.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Some or all of the system, apparatus, and/or article of manufacture components described above, or parts thereof, can be implemented using instructions, code, and/or other software and/or firmware, etc. stored on a machine accessible or readable medium and executable by, for example, a processor system. When any of the appended claims are read to cover a purely software and/or firmware implementation, at least one of the components is hereby expressly defined to include a tangible medium such as a memory, DVD, Blu-ray, CD, etc. storing the software and/or firmware.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, Blu-ray disc, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

Thus, certain examples produce whisker filaments that perform as biomimetic sensors. Geometric and mechanical properties of the artificial whiskers can be characterized at several length scales. The bending modulus of the polycarbonate whiskers increases along the length of the whisker due to two phenomena that occurred during manufacture: coalescence and particle migration. Further, the SCFD-manufactured whiskers can act as tactile sensors. Polycarbonate, SCFD-produced whiskers are more accurate in object localization than whiskers that did not include a taper and/or were made from materials with less-suitable mechanical properties.

In certain examples, the dynamic properties of the whisker control how the whisker behaves during and after a deflection. An artificial whisker is to have a short relaxation time so that the whisker can quickly return from a deflection. However, if the whisker does not have sufficient intrinsic damping, then excessive vibration can occur after a deflection, introducing noise into any transmitted force signal. For polymeric materials, these constraints mean choosing a polymer with a glass transition temperature greater than room temperature and damping properties to allow the whisker to return quickly from deformation with minimal vibration at room temperature, for example.

Certain examples provide a bio-mimetic, artificial whisker that can be used in conjunction with a robotic sensory system to provide tactile feedback and a mechatronic analogue to the biological neuro-sensory pathway observed in the rat. Certain examples provide a method and associated apparatus for whisker production that can mass produce artificial whiskers that have similar geometric and mechanical properties to the biological rat vibrissae. The microstructure development and resulting change in mechanical properties along the whisker enable prediction and control of the microstructure through manipulation of material components and processing parameters. When the mechanical properties of the artificial whiskers can be controlled during processing and/or material design, whiskers can be produced to have a tailored response to loads and/or be optimized for different applications.

Creating an artificial whisker poses both manufacturing and materials challenges: the whisker diameter must taper in a manner that bridges micro and macro length scales, and the whisker must have material properties that permit large elastic deformations. Certain examples provide a whisker developed using a 3-D printable polycarbonate (e.g., PC-Max™, etc.). A process referred to as "surface conforming fiber drawing" (SCFD) can be used to create whiskers with an $R_{slope}$ comparable to biological rat vibrissae, for example. The whiskers exhibit highly functional mechanical properties and can undergo large elastic deformations. In certain examples, a cylindrical filament is clamped at one end and laid across a heated Teflon™ and/or other polytetrafluoroethylene plate that raises the temperature of the filament past the glass transition temperature (Tg) of the material. A small constant force (~200 mN-2N) is then applied to the filament to deform the filament and produce a taper over a period of ~30 s, for example.

The resulting artificial whisker demonstrates improved sensitivity and location sensing over previous solutions. The whisker can sustain repeated deflections and exhibits appropriate dynamic behavior for operation as a sensor. The manufacturing process is shown to induce a gradual change in the microstructure of the whisker which results in a ~40% increase in bending modulus along the length of the whisker, for example. The observed increase in bending modulus does not prevent the whisker from successfully performing as a haptic sensor.

For example, SCFD whiskers produced from PC-Max meet the majority of desired features for the production of biomimetic whiskers. SCFD can be used to pull a filament of PC-Max to draw and taper the thermoplastic to produce whiskers with an $R_{slope}$ sufficient for the whiskers to match the geometry of biological vibrissae. SCFD as a manufacturing procedure can be adjusted for different whisker geometries by change the drawing rate, the heated length of filament, and the temperature of the bed, for example. SCFD can be used with thermoplastic material to induce curvature in the filament for accurate reproduction of biological vibrissae in the drawn, artificial whisker.

SCFD whiskers are strong, flexible, and can achieve a high aspect ratio, linear taper, and have mechanical properties that are close to the biological rat whiskers. Compared to previous solutions, SCFD whiskers demonstrate higher aspect ratios and finer tip diameters (≈30 µm) than what has been previously presented in the literature. In addition, SCFD produced whiskers are can undergo large deflections repeatedly due being manufactured from a single piece of polycarbonate. This has additional benefits for maintaining a smooth, consistent taper near the whisker tip, whereas additive manufacturing methods can produce a coarse, uneven profile due to the digital, layer-by-layer deposition of material. As soft robotics becomes more prevalent, understanding the dynamic and static behavior of polymers in response to inputs and loads becomes a crucial part of characterizing the overall performance of a robotic system.

Example 1 provides a method of manufacturing an artificial whisker. The example method includes removably affixing a first end of a filament to a heated, non-stick surface; drawing the filament across the heated, non-stick surface to form a first, tapered portion, a second portion of the filament remaining on the heated, non-stick surface, wherein the filament is to be drawn until the first portion is disengaged from the heated, non-stick surface; and separating the first, tapered portion of the filament from the second portion of the filament to form a tapered artificial whisker.

Example 2 provides an artificial whisker formed by drawing a filament across a heated, non-stick surface to form a first, tapered portion, a second portion of the filament remaining on the heated, non-stick surface, the filament drawn until the first, tapered portion is disengaged from the heated, non-stick surface and the first, tapered portion is separated from the second portion of the filament to form the artificial whisker, the artificial whisker tapered to include a tip diameter smaller than a base diameter of the artificial whisker, the artificial whisker formed from a polymer arranged to permit elastic deformation of the artificial whisker, the deformation of the artificial whisker to transmit force to a sensor associated with a base of the artificial whisker.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of manufacturing an artificial whisker, the method comprising:
  removably affixing a first end of a filament to a heated, non-stick surface;
  drawing the filament across the heated, non-stick surface to form a first, tapered portion, a second portion of the filament remaining on the heated, non-stick surface, wherein the filament is to be drawn until the first portion is disengaged from the heated, non-stick surface; and
  separating the first, tapered portion of the filament from the second portion of the filament to form a tapered artificial whisker.

2. The method of claim 1, wherein the filament includes a cylindrical filament formed from at least one of a polycarbonate or an acrylonitrile-butadiene-styrene material.

3. The method of claim 1, wherein the heated, non-stick surface includes a heated polytetrafluoroethylene plate.

4. The method of claim 1, wherein the heated, non-stick surface is to raise a temperature of the filament past a glass transition temperature (Tg) of the filament.

5. The method of claim 1, wherein drawing the filament further includes applying a constant velocity to the filament to deform the filament and produce a taper in the filament over a time period.

6. The method of claim 5, wherein a force applied to maintain the constant velocity is between two hundred millinewtons and two Newtons applied over a time period of thirty seconds.

7. The method of claim 5, wherein the taper formed in the filament is to be determined by a taper profile.

8. The method of claim 5, wherein the filament is drawn to form the tapered artificial whisker with a whisker slope between 0.001 and 0.003.

9. A method of manufacturing a sensor device, the method comprising:
    removably affixing a first end of a filament to a heated, non-stick surface;
    drawing the filament across the heated, non-stick surface to form a first, tapered portion, a second portion of the filament remaining on the heated, non-stick surface, wherein the filament is to be drawn until the first portion is disengaged from the heated, non-stick surface;
    separating the first, tapered portion of the filament from the second portion of the filament to form a tapered artificial whisker; and
    affixing the artificial whisker to sensor electronics to form a sensor device.

10. The method of claim 9, wherein the artificial whisker is to provide tactile feedback to the sensor electronics when in contact with an object.

* * * * *